United States Patent [19]
Kamarei

[11] Patent Number: 5,985,339
[45] Date of Patent: Nov. 16, 1999

[54] REFRIGERATION-SHELF-STABLE READY-TO-DRINK COMPLETE NUTRITIONAL COMPOSITIONS AND PRODUCTS

[76] Inventor: A. Reza Kamarei, 176 Loomis Ct., Princeton, N.J. 08540

[21] Appl. No.: 08/975,692

[22] Filed: Nov. 21, 1997

Related U.S. Application Data

[60] Provisional application No. 60/031,637, Nov. 22, 1996.
[51] Int. Cl.$^6$ ..................................................... A23L 1/30
[52] U.S. Cl. ................................ 426/72; 426/73; 426/74; 426/397; 426/410; 426/541; 426/590; 426/648; 426/656; 426/658; 229/125.42; 229/249; 514/2; 514/21
[58] Field of Search ................................ 426/72, 73, 74, 426/590, 541, 658, 648, 656, 397, 410; 229/249, 125.42; 514/21, 2

[56] References Cited

U.S. PATENT DOCUMENTS

| | | | |
|---|---|---|---|
| 2,379,586 | 7/1945 | Manning et al. | 99/11 |
| 3,097,947 | 7/1963 | Kemmerer et al. | 99/63 |
| 3,385,714 | 5/1968 | Smith | 99/171 |
| 3,536,494 | 10/1970 | Johnson | 99/11 |
| 3,950,547 | 4/1976 | Lamar, III et al. | 426/74 |
| 4,070,488 | 1/1978 | Davis | 426/72 |
| 4,112,123 | 9/1978 | Roberts | 426/72 |
| 4,235,936 | 11/1980 | Kahn et al. | 426/330.3 |
| 4,268,529 | 5/1981 | Davis et al. | 426/72 |
| 4,332,824 | 6/1982 | Kahn et al. | 426/330.3 |
| 4,414,238 | 11/1983 | Schmidl | 426/602 |
| 4,486,413 | 12/1984 | Wisenberger et al. | 424/177 |
| 4,490,401 | 12/1984 | Becker et al. | 426/407 |
| 4,497,800 | 2/1985 | Larson et al. | 514/2 |
| 4,710,387 | 12/1987 | Uiterwaal et al. | 426/72 |
| 4,801,466 | 1/1989 | Clyne et al. | 426/232 |
| 4,803,087 | 2/1989 | Karinen | 426/73 |
| 4,853,246 | 8/1989 | Stevens | 426/580 |
| 4,992,282 | 2/1991 | Mehansho et al. | 426/72 |
| 5,064,674 | 11/1991 | Girah | 426/580 |
| 5,104,677 | 4/1992 | Behr et al. | 426/590 |
| 5,126,162 | 6/1992 | Erasmus | 426/657 |
| 5,200,226 | 4/1993 | Rodriquez | 426/585 |
| 5,266,343 | 11/1993 | Stauffer | 426/522 |
| 5,415,885 | 5/1995 | Owades et al. | 426/590 |
| 5,416,077 | 5/1995 | Hwang et al. | 514/54 |
| 5,421,512 | 6/1995 | Poole | 229/249 |
| 5,431,939 | 7/1995 | Cox et al. | 426/300 |
| 5,447,741 | 9/1995 | Goldman | 426/580 |
| 5,449,523 | 9/1995 | Hansen et al. | 426/42 |
| 5,470,597 | 11/1995 | Mendenhall | 426/521 |
| 5,514,391 | 5/1996 | Bushnell et al. | 426/237 |
| 5,520,948 | 5/1996 | Kvamme | 426/590 |
| 5,555,702 | 9/1996 | Sizer | 53/127 |
| 5,558,897 | 9/1996 | Goldman | 426/580 |
| 5,641,531 | 6/1997 | Liebrecht et al. | 426/583 |

OTHER PUBLICATIONS

M. J. Lewis, Heat Treatment of Milk, In: Modern Dairy Technology, vol. 1 Advances in Milk Processing, 2nd Edition, Chapman & Hall, 1994.

I. Rosenthal, Milk and Dairy Products—Properties and Processing, Balaban Publishers, 1991.

H. Burton, Ultra–High–Temperature Processing of Milk and Milk Products, Elsevier Applied Science, 1988.

G. Bonin et al., Fluid Milk, in: Dairy Science and Technology—Principles and applications, les presses de l'universite laval, Quebec, 1985.

R. Early, The Technology of Dairy Products, VCH Publishers, NY, 1992.

A.H. Varnam and J.P. Sutherland, Milk and Milk Products—Technology, Chemistry, and Microbiology, Chapman & Hall, 1994.

Preventing Microbial Contamination of Enternal Formulas and Delivery System, Ross Product Division, Abbott Laboratories, Columbus, Ohio Apr. 1996.

Ross Medical Nutritional System, A Total Commitment to Enteral Nutrition, 1995, pp. 2–3, 6–15, 1–19, 22–39, 44–49, 52–57.

Ross Products Division, Abbott Laboratories, 1996, Advertisement for Ensure® Light.

Ross Products Division, Abott Laboratories, Jan. 1996, Advertisement for Ensure® Light.

Mead Johnson, Eternal Systems Guide, 1994, pp. 2–11, 18–25, 30, 34–37.

Mead Johnson, Boost® Nutritional Energy Drink Advertisement, 1995.

Mead Johnson, Kangaroo® Delivery Systems Advertisement, 1996.

Mead Johnson Nutritionals, Sep. 1996, Advertisement.

Sandoz Nutrition, Enteral Products Pocket Guide, 1995, pp. 4–27, 30–39.

Clintec, Enteral Product Guide, 1994, pp. 2–3, 10–13, 20–29, 34–67.

Sherwood Medical, Enteral Formulas, 1995, pp. 6–11, 14–17, 20–21, 24–25.

*Primary Examiner*—Chhaya D. Sayala
*Attorney, Agent, or Firm*—Hoffman & Baron, LLP

[57] ABSTRACT

Refrigeration-shelf-stable ready-to-drink complete nutritional products such as nutritional supplements, foods for special dietary use, and medical foods can be prepared through an ultra-pasteurization and/or pasteurization process. By varying the choice and quantity of nutritional and functional ingredients, and by varying processing conditions, various such products can be obtained that specifically target the nutritional and health needs of different health conditions and diseases in both healthy individuals and patient populations. Daily values for calories, carbohydrates, fat, protein, minerals and vitamins are calculated to provide a complete nutritional product which when consumed within the refrigeration shelf-life will have substantially maintained its completeness.

71 Claims, No Drawings

REFRIGERATION-SHELF-STABLE READY-TO-DRINK COMPLETE NUTRITIONAL COMPOSITIONS AND PRODUCTS

RELATED APPLICATIONS

The present applications claims priority to U.S. Provisional Application No. 60/031,637, filed Nov. 22, 1996 which is incorporated in its entirety herein by reference.

FIELD OF THE INVENTION

This invention relates to the field of complete nutritional compositions and products and more particularly to refrigeration-shelf-stable ready-to-drink complete nutritional compositions and products which are prepared using pasteurization or ultra-pasteurization processes. This invention further relates to the preparation of nutritional supplements (NS), foods for special dietary use (FSDU), and medical foods (MF), as defined by the U.S. Code of Federal Regulations.

BACKGROUND OF THE INVENTION

Nutrition is one of the cornerstones of health, well-being, and the prevention and treatment of numerous chronic diseases. Nutritional products play an important role in these areas and attempts to provide cost-efficient, readily available and convenient nutritional products to the general public and those with special dietary needs has been a major focus in recent years. Complete nutritional products, i.e. those which contain all the essential macro and micro nutrients, have heretofore been available only in sterilized products or frozen products. Sterilized products are generally sold in hermetically sealed containers such as cans and are intended to have a long room temperature shelf-life. Table 2 lists many commercially available sterilized nutritional products. Such products require expensive processing steps which must be carefully controlled to properly remove microorganisms and bacterial enzymes. As will be discussed further herein, sterilization processes, due to the severity of the heat treatment can cause undesirable physical, chemical, enzymatic and microbial changes which deleteriously affect the final product. Moreover, although such sterilized products are often marketed as "ready-to-drink", they are typically stored at room temperature and therefore require refrigeration for maximum taste. Moreover, enzymatic reactions still occur, albeit slower, during room temperature storage of sterilized products. Such reactions can result in a host of undesirable defects, such as the destruction of vitamins which are necessary to the integrity of the overall product. Since sterilized products are designed to have up to one and a half year of room temperature shelf-life, such a product will have a different actual content of degradable micro nutrients (vitamins) in the early part of its shelf-life as compared to the latter part. Thus, a consumer will obtain a different and unknown amount of vitamins depending on when the sterilized product is consumed. To account for this slow degradative process during long-term shelf-life, manufacturers of sterilized complete nutritional products often include up to 50% more of a given vitamin than would normally be included to account for the inherent degradation loss and to ensure the product is likely to contain at least the labeled amount of nutrients at the end of its shelf-life. Such large overdosing results in an imbalance in the taste of the product, particularly if consumed in the early stages of its shelf-life. Moreover, the cost factor of including such large overdoses is enormous. In addition to the high cost of sterilization, and increased overdosing of vitamins, sterilization processes require high cost packaging, such as in metal cans and room-temperature self-stable laminated packages such as TetraBric® & Combibloc®.

In addition to sterilized complete nutritional products, there are several frozen ultra-pasteurized or pasteurized complete nutritional products which are commercially available. These are set forth in Table 3. Frozen products cannot truly be considered ready-to-drink at the point of purchase because they require thawing before consumption.

More importantly, however, the freezing and thawing process has a number of known deleterious affects on complex compositions which have a variety of sensitive components contained therein. For example, upon freezing and thawing of a complex nutritional composition such as those of the present invention, a series of physical-chemical reactions can occur in the product. Phase separation, and the resultant unpleasant appearance is a common problem. Additionally, proteins can become denatured and precipitate out during the thawing process. Such precipitate is not only undesirable from an appearance point of view to the consumer, but also has unwanted texture and mouthfeel characteristics. Flavors, vitamins and minerals can become physically entrapped in the precipitate complex. It is common for consumers to drink only the liquid phase of a beverage and ignore the undesired solid phase which precipitates out. As a result, the consumer is effectively deprived of the very nutrients for which the composition is designed to deliver. The result is a product which is ineffective at meeting its intended function and the needs of the consumer or patient.

Moreover, frozen products require the extra steps of freezing during processing, require special handling during distribution and special storage systems as well. Frozen products generally need to be thawed in a refrigerator for 24 hours prior to use. Other products which are not frozen, such as modified milks and milk substitutes, are commercially available but are nutritionally incomplete from the vitamin and mineral point of view.

Like milk, liquid nutritional products (usually containing milk proteins) are heated for a variety of reasons, the main reasons being: to remove potential pathogenic organisms and to increase shelf-life. The major concerns about the resulting products of thermal process are safety and quality. Like milk, heat-treated nutritional products should not be a public heath risk. They should have a good keeping quality, provide an intended balance of nutrients, and be of desirable sensory characteristics, i.e., appearance, color, flavor, and mouth feel. When milk or nutritional products are heated at a constant temperature, all their constituents and components will be affected, but to different extents. Increasing the temperature will accelerate reaction rates. But different reactions will be affected to different extents. Physical, chemical, enzymatic and microbial changes will depend principally upon the time-temperature conditions, but will also be influenced by other factors, such as composition, pH, and oxygen content. The wide range of reactions taking place when nutritional products are heated will influence the safety and quality of the product. Upon heating of products at higher temperatures for longer times, some undesirable changes can also take place (e.g., decrease in pH, Maillard browning, cooked caramel flavor, denaturation of whey proteins and interaction with casein). The changes that take place during heating and subsequent storage, can affect the nutritional value and sensory characteristics.

In thermal processing, the most important parameter is the level of microbial inactivation achieved. For safety reasons, the minimum holding time (residence time) should be considered for microbial inactivation, although this will give an underestimate of the true level of microbial inactivation.

In terms of microbial quality and reducing spoilage rates, the emphasis is toward that of prevention. One approach, now widely used, is that of Hazard Analysis Critical Control Points (HACCP). Here the philosophy is to identify where hazard may occur from raw materials, different processing stages, packaging, or subsequent handling and storage. Critical control points are then established. These are points in the production process where the hazard can be effectively controlled. Loss of control permits the realization of the potential hazard as an unacceptable food safety or spoilage risk.

The quality of raw materials (ingredients) also has a pronounced effect on the quality of the final product. From the microbial point of view, the ingredients must be free of serious pathogens, and have initial total bacterial counts not more than 104 per gram. This reflects good hygiene in production of the ingredients. It is also useful to monitor psychotropic bacteria in raw ingredients (via direct assay of proteolytic enzymes) as they are usually predominant among the microorganisms found in pasteurized products.

Sterilization (Prior Art)

The currently practiced process for preparation of Nutritional Supplements, Foods for Special Dietary Use, and Medical Foods, is thermal sterilization. Table 2 shows that, at the present time, there are more than a hundred of these liquid nutritional products available in the market. All of these products are commercially sterile and offered in cans, Tetra Brik®, or Combibloc®, and are stored at room temperature (i.e., they are shelf-stable). None of these nutritional products are prepared or offered as ultra-pasteurized or pasteurized product.

Sterilizing a product means exposing it to such powerful heat treatment that all microorganisms are killed. However, absolute sterility is not possible. The term "Commercial Sterility" is used instead. From the U.S. regulations point-of-view (21 CFR 113.3, 1996), "Commercial Sterility" of thermally processed food means the condition achieved 1) By the application of heat which renders the food free of
   (a) Microorganisms capable of reproducing in the food under normal non-refrigerated conditions of storage and distribution; and
   (b) Viable microorganisms (including spores) of public health significance; or
2) By the control of water activity and the application of heat, which renders the food free of microorganisms capable of reproducing in the food under normal non-refrigerated conditions of storage and distribution.

It is common practice in the commercial sterilization of low-acid foods (i.e., pH>4.5) to achieve at least a 12 decimal reduction for spores of *Clostridium botulinum*, because they are the most heat resistant of the major food poisoning organisms.

Two main methods are used for sterilizing liquid nutritional products: in-container sterilization, and UHT (Ultra High Temperature) treatment. For in-container sterilization, two different types of sterilizers are used: autoclaves (retorts) for batch processing, and hydrostatic towers for continuous processing. For UHT treatment, where the product is sterilized in a continuous flow followed by aseptic filling, two different types of sterilizing systems are also used. One of these methods operates on the principle of direct steam injection or steam infusion and the other on indirect heating in heat exchanger.

In the retort sterilization method, the nutritional product is usually preheated and then filled into a clean can, plastic bag, etc., hermetically sealed, and placed in a steam chamber and sterilized, normally at 121° C. (250° F.) for 15–40 minutes. The batch is then cooled and the retort filled with a new batch. The fact that sterilization takes place after filling eliminates the need for aseptic handling but, on the other hand, only heat resistant packaging materials can be used. In the hydrostatic tower method of in-container sterilization, the nutritional product containers are slowly conveyed through successive heating and cooling zones in the sterilizer. These zones are dimensioned to correspond to the required temperatures and holding times in the various treatment stages.

In the UHT treatment, the nutritional product is pumped through a closed system. On the way it is preheated, sterilized, homogenized, cooled, and filled aseptically. This method is generally understood as a treatment in which product is heated to a temperature of 135 to 150° C. in continuous flow in a heat exchanger for a sufficient length of time to achieve commercial sterility with an acceptable amount of change in the product. From the U.S. regulations point-of-view (21 CFR 113.3, 1996), aseptic processing and packaging means the filling of a commercially sterilized cooled product into pre-sterilized containers, followed by aseptic hermetical sealing, with a pre-sterilized closure, in an atmosphere free of microorganisms. Sterilization takes place at 135–150° C. (275–300° F.) for 2–5 seconds, either by means of indirect heating, direct steam injection or infusion. All parts of the system downstream of the actual sterilization section are of aseptic design in order to eliminate the risk of reinfection.

Although bacterial enzymes do not normally survive an in-container process to cause adverse effects during subsequent storage of the product, they will survive a UHT process to a high degree to give such problems as off-flavor and gelation during storage. In the absence of some other system for inactivating the enzyme e.g., the low temperature holding system (such as for ultra-pasteurized products), the only solution is to avoid them by careful control of the raw material to prevent the growth of the psychotropic organisms which give rise to these very resistant enzymes.

Aseptic filling is an integral part and a crucial step in UHT treatment. The container itself will need sterilization before filling. Cans (Dole) are sterilized by superheated steam. Presently, all sterilized nutritional products in the market (except Sandoz's Resource® and Ross's Toddler's Best™ which are in Tetra Brik®) are packaged in cans (Table 2).

Most packages used in the UHT processes are sterilized with hydrogen peroxide at a concentration of between 20 and 35 percent and a temperature between 80 and 85° C. Residence times of several seconds are required. Care should be taken to ensure that all hydrogen peroxide is removed, as it is a strong oxidizing agent. The oxygen permeability of the plastic is important and may well influence the shelf-life of the product. Laminated packages, comprising several layers including paper, plastic, and aluminum foil offer a complete barrier. The most popular shapes are the brick or block. The packages are either formed from a single roll of material (Tetra Pak®), or preformed blanks (Combibloc®). Some of these have a head space, whereas other do not.

More recently, a can with a plastic body and metal ends has appeared on the market. Some of Ross®'s nutritional products are packaged in these cans. These products are sterilized with hydrogen peroxide.

Another term used in connection with UHT treatment to characterize the quality of the treatment is the "shelf-life" of the product. This is defined as the time which the product can be stored without the quality falling below a certain acceptable, minimum level. The concept is subjective—the shelf-life can be very long if the criteria of product quality are low. The physical and chemical limiting factors of shelf-life are gelling, increase of viscosity, sedimentation, and phase separation. The organoleptic limiting factors are deterioration of taste, smell, and color.

There is a need for a refrigeration-shelf-stable ready-to-drink complete nutritional product which does not suffer from the disadvantages of sterilized and frozen products. Such products will include all the essential macro and micro nutrients, will be organoleptically pleasing, have a shelf-life of between about 1 and 16 weeks and use the simple and inexpensive processing of pasteurization or ultra-pasteurization. Moreover, there is a need for a cost effective ready-to-drink complete nutritional composition which can be refrigeration-stored in inexpensive packaging, such as gable top cartons or plastic containers traditionally used in milk products.

The present invention meets these and other needs, as will come apparent in the description provided below.

THE SUMMARY OF THE INVENTION

The present invention relates to refrigeration-shelf-stable ready-to-drink complete nutritional compositions which have been either pasteurized or ultra-pasteurized and which are designed to include per 8 fluid ounces a specified percentage range of each essential macro and micro-nutrient. The product is also designed to have a total calorie content of about 5% to 20% of the daily value. The daily value is based on a 2,000 calorie diet. The compositions of the present invention can optionally include fat, sodium, dietary fiber and other non-essential but nutritionally functional components.

In one embodiment, the present invention includes a refrigeration-shelf-stable ready-to-drink complete nutritional beverage composition being thermally treated under conditions of pasteurization or ultra-pasteurization comprising, per eight fluid ounces: from about 10% to about 25% of the daily value of carbohydrate; from about 5% to about 40% of the daily value of protein; from about 20% to about 50% of the daily value of each of the following: vitamin A, iron, vitamin D, vitamin K, thiamine, riboflavin, niacin, vitamin B6, folate, vitamin B12, biotin, pantothenic acid, phosphorus, iodine, magnesium, zinc, selenium, copper, manganese, chromium, and molybdenum; about 5% to about 25% of the daily requirement of potassium; beta carotene in the amount of about 10% to about 50% of vitamin A; about 20% to about 80% of each of the following: vitamin C, calcium, vitamin E; and about 5% to about 40% of the daily value of chloride; wherein the total calorie content is from about 5% to about 20% of the daily value and the daily value is based on a 2,000 calorie diet.

The compositions of the present invention are designed to be refrigeration shelf-stable. That is, the shelf-life will generally be up to about 16 weeks at temperatures of about 1° C. to 7° C. and preferably about 3° to about 4° C. These are conventional refrigeration temperatures for dairy products. Shelf-life for pasteurized compositions of the present invention will generally be up to about 2 weeks, and for ultra-pasteurized compositions of the present invention, the shelf-life will be between about 4 to about 16 weeks.

The refrigerated storage will preserve the overall quality of ultra-pasteurized and pasteurized compositions of the present invention better than room-temperature storage can preserve the quality of commercially available sterilized room temperature shelf-stable products. This is because the rate of all physical, chemical, and enzymatic reactions during storage are decreased at the lower temperatures. Because of the lower initial vitamins and less degradation during low temperature storage, the undesirable off-taste of vitamins are less pronounced in refrigerated products, making them organoleptically more acceptable than non-refrigerated/shelf-stable products and ensuring these components are delivered in the labeled amount to the consumer.

Unlike UHT-sterilized non-refrigerated/shelf-stable products described herein, bacterial enzymes (proteases and lipases) which may be present in the compositions of the present invention cause minimal adverse effects, if any, at conventional dairy refrigeration temperatures. However, in UHT-sterilized non-refrigerated/shelf-stable products, bacterial enzymes can cause off-flavor (astringent, bitterness), and thickening or gelation during storage.

Prolonged storage of sterilized products at temperatures exceeding approximately 30.5° C. (85° F.), can also cause activation of heat-sensitive spores that are not destroyed by usual heat sterilization during manufacturing. At refrigerated storage temperature(s) used for the present inventive concept, especially for relatively short times (1 to 16 weeks), there is much less risk of such a problem.

Compared to sterilized non-refrigerated/shelf-stable products, the cost of vitamin components is lower in the refrigerated shelf-stable compositions of the present invention. This is because there will be less degradation of vitamins at the refrigerated temperature of storage, as well as shorter storage time (up to 16 weeks versus up to 1.5 year), and therefore less requirement for overdosing of the vitamins in the formulation. Furthermore, since production of the inventive refrigerated pasteurized or ultra-pasteurized ready-to-drink complete nutritional compositions will be done in the established dairy factories, usually as "piggyback products", where no capital investment is required, the cost of such production will be reasonably low. As previously mentioned, the cost of packaging of the compositions and products of the present invention is significantly lower than the cost of cans used in sterilization processes. The refrigerated distribution and sale of the nutritional products will also be done as a piggyback to dairy products, also making the distribution cost tolerable. The overall product cost of products made from the present invention will be significantly less than the cost of the sterilized non-refrigerated/shelf-stable products or the nutritional frozen products currently in existence.

Ultra-pasteurization and pasteurization are versatile technologies that are used in every developed and most developing countries. Refrigerated pasteurized and/or ultra-pasteurized ready-to-drink complete nutritional compositions and products, prepared through these versatile technologies, can therefore easily be made locally available at all markets of the world, contributing to the improved health and nutritional status of healthy individuals and patient populations. These methods are much more widespread than the sterilization process.

Unlike regular sterilized non-refrigerated/shelf-stable products, where the primary container is a metal can (Table 2), the primary container for refrigerated products of this invention is a gable top carton. Compared to cans, gable top cartons are lighter, take up less storage space in production plants, are more environmentally friendly, and have built-in reclosable pour spouts.

The food industry, as distinct from the clinical nutrition industry, has primarily used ultra-pasteurization and pasteurization processes and has not been familiar with the more advanced and sophisticated sterilization processes used by the clinical nutrition industry. Table 2 shows evidence of this fact. For example, in nutritional products, the concentration of every single added vitamin (usually 13–15 vitamins) must be calculated in a way that the effect of heat treatment and storage does not affect the label claim concentration of such vitamin. Table 4 shows the source and quantity of each vitamin (in the vitamin premix) to be used in the inventive standard complete nutritional product. Likewise, the concentration of every single added mineral (usually 10–12 minerals) must be calculated in a way that contribution of the same mineral from other ingredients does not affect the label claim concentration of such mineral. Table 5 shows the source and quantity of each mineral (in the mineral premix) to be used in the inventive standard complete nutritional product.

Although ultra-pasteurization and pasteurization have been used extensively for the preparation of refrigerated ready-to-drink dairy products, no one has used these processes to prepare refrigerated pasteurized and/or ultra-pasteurized ready-to drink complete nutritional composition and products. Compositions of the present invention can be used to make nutritional supplements, food for special dietary use, and medical foods. The presently available refrigerated ready-to-drink products are nutritionally incomplete and do not satisfactorily meet the complete nutritional needs (including all necessary vitamins and minerals) of healthy individuals or patient populations, as set forth by U.S. federal regulations (21 CFR 101.9, 1996).

DETAILED DESCRIPTION OF THE INVENTION

Definitions

Nutritional Supplements (NS)

There is no regulatory definition for the term Nutritional Supplement. For purpose of the present invention, the term "Nutritional Supplement" means: a complete diet which provides the total nutrient needs solely by the oral consumption of adequate amounts of a product. Nutritional Supplements will maintain an individual's good nutritional status. Nutritional Supplements are different from, and are more complete than, "Dietary Supplements," as described in the Dietary Supplement Health and Education Act of 1994.

In view of the above definition, nutritional supplements must minimally contain and declare on their packages (e.g., under % Daily Value in the Nutrition Facts table), the concentration of all nutritionally essential macro nutrients and micro nutrients (13 vitamins and 14 minerals), as indicated in the Code of Federal Regulations 21 CFR 101.9, 1996 (table 1). In Nutritional Supplements, no essential nutrient is disregarded or is given the concentration of zero (except for fat in fat-free products, fiber in residue-free products and sodium in sodium-free products).

In addition, some non-essential, but valuable nutritional or functional compounds (such as choline, taurine, L-carnitine, emulsifiers, stabilizers, color, flavor, etc.) can be added to the formulation of nutritional supplements.

Foods for Special Dietary Uses (FSDU)

Unlike Nutritional Supplements, there is a regulatory definition for the term Foods for Special Dietary Uses. The term "Food for Special Dietary Uses" is defined in the code of federal regulations (21 CFR 105.3, 1996) as the following, which shall be adopted in the present invention:

(1) the term "Special Dietary Uses", as applied to food for man, means particular (as distinguished from general) uses of food, as follows:
  I) uses for supplying particular dietary needs which exist by reason of a physical, physiological, pathological or other condition, including but not limited to the conditions of diseases, convalescence, pregnancy, lactation, allergic hypersensitivity to food, underweight, and overweight;
  ii) Uses for supplying particular dietary needs which exist by reason of age, including but not limited to the ages of infancy and childhood;
  iii) Uses for supplementing or fortifying the ordinary or usual diet with any vitamin, mineral, or other dietary property. Any such particular use of a food is a special dietary use, regardless of whether such food also purports to be or is represented for general use.
(2) The use of an artificial sweetener in a food, except when specifically and solely used for achieving a physical characteristic in the food which cannot be achieved with sugar or other nutritive sweetener, shall be considered a use for regulation of the intake of calories and available carbohydrate, or for use in the diets of diabetics and is therefore a special dietary use.

Examples of the Foods for Special Dietary Use (FSDU) are hypoallergenic foods, infant foods, foods for reducing and maintaining body weight, foods for use in the diet of diabetics, and foods used to regulate sodium intake and the like.

Medical Foods (MF)

There is also a regulatory definition for the term Medical Food. The term "Medical Food" is defined in the Orphan Drug Act Amendments of 1988 [21 USC 360ee (b)(3)]. This definition was incorporated by reference into the Nutrition Labeling and Education Act (P.L. 101–535) in November 1990. It is incorporated into the FDA's final rule on Mandatory Nutritional Labeling January, 1993.

For purposes of the present invention, the term "Medical Food" shall mean a food which is formulated to be consumed or administered enterally under the supervision of a physician and which is intended for the specific dietary management of a disease or condition for which distinctive nutritional requirements based on recognized scientific principles are established by medical evaluation.

To be considered a Medical Food, a product must, at a minimum, meet the following criteria:
  a) The product is a food for oral or tube feeding;
  b) The product is labeled for the dietary management of a medical disorder, disease, or condition; and
  c) The product is labeled to be used under medical supervision, and is primarily obtained through hospitals, clinics, and other medical and long term care facilities.

Medical Foods are distinguished from the broader category of Foods for Special Dietary Use and from foods that make health claims by the requirement that medical foods be used under medical supervision.

The term "Medical Food" does not pertain to all foods fed to sick patients. Medical Foods are foods that are specially formulated and processed (as opposed to a naturally occurring foods used in their natural state) for the patient who is seriously ill or who requires the product as a major treatment modality. Typical medical foods are enteral nutrition products, i.e., products provided through the gastrointestinal tract, taken by mouth, or provided through a tube or catheter that delivers nutrients beyond the oral cavity or directly to the stomach.

Medical foods can be classified into the following four groups:

1) Nutritionally complete formulas.
2) Nutritionally incomplete formulas, including individual "modular" type products that may be mixed with other products before use (e.g., protein, carbohydrate, or fat modular).
3) Formulas for metabolic (genetic) disorders in patients over 12 month of age.
4) Oral rehydration products.

In some Foods for Special Dietary Use (FSDU), and in some Medical Foods (MF), the need for some nutritionally essential macro nutrients and micro nutrients may decrease. However, scientific literature does not indicate any chronic condition that the need for an essential macro nutrient or micronutrient is totally eliminated. Consequently (similar to Nutritional Supplements (NS)), Foods for Special Dietary Use (FSDU), and Medical Foods (MF) must minimally contain and declare on their package (e.g., under % Daily Value in the Nutrition Facts table), the concentration of all nutritionally essential macro nutrients and micro nutrients (13 vitamins and 14 minerals), as indicated in the Code of Federal Regulations 21 CFR 101.9, 1996 (table 1). In Foods for Special Dietary Use (FSDU), and Medical Foods (MF), no essential nutrient is disregarded or is given the concentration of zero (except, for a limited time, for fat in fat-free products, and fiber in residue-free products).

Ultra-Pasteurization

The first alternative process for preparation of refrigerated compositions of the present invention, and particularly in the form of ready-to-drink nutritional supplements (NS), foods for special dietary use (FSDU), and medical foods (MF), is thermal ultra-pasteurization.

From the U.S. regulation point-of-view (21 CFR 131.3, 1996), Ultra-pasteurization when used to describe a dairy product means that such product shall have been thermally processed at or above 280° F. for at least 2 seconds, either before or after packaging, so as to produce a product which has an extended shelf-life under refrigerated conditions.

Comparison of the regulatory definition for ultra-pasteurization with the regulatory definition for aseptic processing and packaging clarifies that while ultra-pasteurized products are thermally sterilized, they should be stored under refrigerated condition. In fact storage temperature of sterilized nutritional products (room temperature) and ultra-pasteurized nutritional products (refrigerated temperature) is an important distinction between products prepared by these two processes.

The containers for packaging of liquid nutritional products, through the production and distribution network, must also meet certain requirements. The shape and presentation must be attractive, provide effective protection against impact, light, and heat, and be easy to open. They also must protect the product from contamination by foreign flavors or odors, be easy to carry, non-returnable (one-way), environmentally friendly, reasonably priced, and well adapted to modern production needs. At the present time, "Gable Top Cartons" are the packaging of choice for liquid dairy products and the preferred packaging to the present invention because they meet all of the above requirements. They have better handling and a built-in reclosable pour spout. They are lightweight but rugged and shatterproof. They are convenient, easily disposable, and almost universally available. Gable top carton unformed flat blanks save valuable warehouse storage space.

Structurally, gable top cartons are made of cardboard lined with polyethylene and are generally preassembled in the plant. In order to meet certain particular requirements, more sophisticated manufacturing methods are sometimes required; for example, a thin layer of aluminum may be used to line the interior walls of the container to provide an effective barrier against oxygen penetration and provide better conservation.

Alternatively, the ultra-pasteurized and pasteurized nutritional products of the present invention may also be packaged in other type of containers such as plastic containers.

The refrigerated storage will preserve the quality of our ultra-pasteurized products better than room-temperature storage can preserve the quality of commercially available sterilized non-refrigerated/shelf-stable products. As previously mentioned, prolonged storage of sterilized canned or boxed products at temperatures exceeding approximately 30.5° C. (85° F.), can cause activation of heat-sensitive spores that are not destroyed by usual heat sterilization during manufacturing. See "Preventing Microbial Contamination of Enteral Formulas and Delivery System", Ross Product Division, Abbott Laboratories, Columbus, Ohio April 1996. Moreover, protease and lipase enzymes, produced by psychotropic bacteria, are markedly heat resistant and readily withstand UHT sterilization. Heat-stable enzymes are of limited importance in the spoilage of ultra-pasteurized refrigeration-shelf-stable products. These enzymes are, however, associated with age thickening or gelation in UHT products stored at room temperature. Thickening may be accompanied by the development of off-flavors, the "astringent" defect being attributed to polypeptides resulting from the breakdown of casein. Bitter flavors also develop as a result of the activity of heat-stable microbial proteases. Heat-stable lipases are not involved in structural changes but activity leads to an increase in fatty acid content of the product and acidic off-flavors.

Pasteurization

The second alternative process for the preparation of refrigerated compositions of the present invention, which include uses as a nutritional supplement (NS), foods for special dietary use (FSDU), and medical foods (MF), is thermal pasteurization.

The International Dairy Federation has defined pasteurization as a process applied to a product with the objective of minimizing possible health hazards arising from pathogenic microorganisms associated with milk, by heat treatment, which is consistent with only minimal chemical, physical, and organoleptic changes in the product. For purposes of the present invention, pasteurization will have this meaning.

From the U.S. regulation point-of-view (21 CFR 131.3, 1996), the term "pasteurized" when used to describe a dairy product means that every particle of such product shall have been heated in properly operated equipment to one of the temperatures specified in the table below and held continuously at or above that temperature for the specified time (or other time/temperature relationship which has been demonstrated to be equivalent thereto in microbial destruction):

| Temperature | Time |
| --- | --- |
| 145°F.[1] | 30 minutes |
| 161°F.[1] | 15 seconds |
| 191°F. | 1 second |
| 204°F. | 0.05 second |
| 212°F. | 0.01 second |

[1] If the dairy ingredient has a fat content of 10 percent or more, or if it contains added sweeteners, the above specified temperature is increased by 5° F.

The main purpose of pasteurization is the thermal killing of pathogens which are the microorganisms causing disease in humans. Pasteurized products must be entirely free from pathogens. In fact, pasteurization of milk is required by law in most countries. The traditional pathogens in raw milk are *Mycobacterium bovis* which causes bovine tuberculosis (which also affects humans), *Brucella abortus* which transmits brucellosis (undulant fever) to man, Salmonella which are responsible for gastrointestinal diseases and typhoid fevers and *Campylobacter jejuni*, a common factor in enteritis.

Apart from pathogenic microorganisms, nutritional products or milk also contains other substances and microorganisms which may spoil the taste and shelf-life of the product. A secondary purpose of pasteurization is therefore to destroy as many as possible of these other organisms and enzymatic systems in order to safeguard product quality. This requires more intensive heat treatment than is necessary to kill the pathogenic bacteria.

To ensure the destruction of all pathogenic microorganisms, it is necessary to heat the product to a given temperature and hold it at that temperature for a certain length of time before it is cooled again. The combination of temperature and holding time is very important as it determines the intensity of the heat treatment.

Intensive heat treatment of product is desirable from the microbiological point of view. But such treatment also involves a risk of adverse effects on the appearance, taste and nutritional value of the product. The choice of time/temperature combination is therefore a matter of optimization in which both microbiological effects and quality aspects must taken into account.

The original type of pasteurization was a batch process (also called Low Temperature Long Time, LTLT). The milk was heated to 63° C. in open vats and held at that temperature for 30 minutes. Nowadays pasteurization is almost always in the continuous HTST (High Temperature Short Time) process. The main advantages of HTST pasteurization is its capacity to heat-treat milk quickly and adequately while maintaining rigid bacteriological and quality control.

The actual time/temperature combination varies according to the quality of the raw materials, the type of product treated, and the required keeping properties. The combination of higher temperatures and longer times are recommended for HTST pasteurization of products with a higher content of solids. Thus, for pasteurized cream of 18% fat, the specifications are 75° C. for 15 seconds, for cream of 35% fat, 80° C. for 15 second, and for pasteurized concentrated milk (similar to our proposed nutritional products), 80° C. for 25 seconds.

The function of each nutrient in a system not only depends on the general conditions of the system (e.g., temperature and pH), but also to a great extent on the presence or absence of other nutrients. This is because each new nutrient functions like a new chemical entity that can react with other nutrients in the system. These new reactions can include degradation of vitamins, precipitation of minerals, denaturation and crosslinking proteins, changes in hydrocolloidal behavior of carbohydrates, phase separation of the system, changes of sensory profile, and changes in nutritional bioavailability of the system.

For example, consider a pasteurized or ultra-pasteurized nutritional product which is deficient in several vitamins (e.g. E, K, Niacin, Folate and Biotin), electrolyte Chlorine, minerals (e.g. Iodine, Magnesium, Zinc, Copper, Manganese) and trace minerals (e.g., Selenium, Chromium, Molybdenum). Upon addition to these new nutrients to such nutritional product, all or some of the above reactions can occur in the system and even one skilled in the art cannot scientifically predict how a series of such new nutrients will interact in an already complex nutritional product. Thus, the physical, chemical, biological, and sensory characteristics of nutritional products are reflective of the composition of all nutrients in the system, and one skilled in the art cannot predict how a series of new nutrients will behave, react with other nutrients of they system, or affect the characteristics of a nutritional product under new processing and storage conditions.

Pasteurization and ultra-pasteurization may also be accomplished using ohmic or microwave heating.

The compositions of the present invention have been formulated such that the resultant pH is essentially neutral, e.g., about 5.5 to about 7.5. Preservation of the inventive compositions is accomplished by pasteurization and ultra-pasteurization methods and is not dependent on acidic pH for preservation. This is a distinct advantage over prior art compositions which in addition to thermal treatment also require acidification.

The fat source of the formulations may be any fat source or blend of fat sources which provide the desired amount of fat calories. Preferably, the fat source should be high in monounsaturated fatty acids. Fat sources may include vegetable oils, e.g., high oleic acid vegetable oils such as sunflower oil, canola oil and olive oil; safflower oil, cottonseed oil, corn oil or soybean oil, and medium chain triglycerides, e.g. $C_6$–$C_{12}$ triglycerides. High oleic acid sunflower oil or cannola oil are preferred. In addition, butter fat and other types of oils may be used. The protein source may be selected from a variety of materials, including without limitation, milk protein, whey protein, caseinate, soy protein, egg whites, gelatins, collagen and combinations thereof. The preferred protein source is milk protein concentrate in combination with isolated soy protein and calcium caseinate.

Included in the protein source are lactose-free skim milk, milk protein isolate, and whey protein isolate.

When the composition is used as a nutritional supplement as defined herein, the protein source can also include enzymatically-hydrolyzed protein (peptides), amino acids and combinations thereof. These protein sources are often used in elemental diets. The amount of protein in eight fluid ounces (250 ml) is about 5 to about 40 percent of the daily value (DV). The energy contained in eight fluid ounces of compositions of the present invention is intended to be about 125–400 Kilo calories.

The carbohydrate source useful in the present invention may be selected from a wide variety of materials such as sucrose, corn syrup solids, glucose, fructose, maltodextrin and combinations thereof. When using corn syrup solids or maltodextrin, it is preferred to use either sucrose, glucose or fructose in combination therewith.

Artificial sweeteners such as saccharine, aspartame, asulfame K, sucrolose and their combination, as well as others, may be incorporated to enhance the organoleptic and sweetness quality of the compositions. Various fiber sources may be included in the compositions of the present invention. These sources may be selected from such materials as oat fiber, soy fiber, guar gum, pectin, soy polysaccharides, gum arabic, hydrolyzed fibers and the like. Cellulose, hemicellulose, hydrocollides, methylcellulose, carboxymethylcellulose and the like are contemplated. Also useful are fructo-oligosaccharides.

Compositions of the present invention can be formulated into a variety of different product forms. For example, a basic or standard composition is one such form. Other forms include light/low-fat, fat-free, high protein, fiber-containing and extra strength (sometimes referred to as "plus"). In a preferred embodiment the macro nutrients comprising fat, carbohydrate and protein are present in amounts of about 0.1% to about 12% of the daily value (D.V.) for fat, about 8% to about 20% of the daily value for carbohydrate and about 7% to about 35% of the daily value for protein. Most preferably, fat is present in the amount of about 3 to about 11% of the daily value; carbohydrate is present in amounts of about 10 to about 19% of the daily value; and protein is present in amounts of about 20 to about 30% of the daily value. These daily value percentages are based on 8 fluid ounces (250 ml) and a 2,000 calorie diet per diem.

In a preferred embodiment, Vitamin A is present preferably in amounts of 20 to about 40% of the daily value per 8 fluid ounces and most preferably in amounts of about 23 to about 30% of the daily value; beta-carotene is present preferably in amounts of about 20 to 40% of Vitamin A and most preferably about 25 to about 35% of Vitamin A per 8 fluid ounces; Vitamin C is present preferably in amounts of about 20% to about 80% of the daily value and most preferably about 23% to about 70% of the daily value per 8 fluid ounces; Vitamin D is present preferably in amounts of about 20 to about 40% of the daily value and most preferably in amounts of about 23 to about 35% of the daily value per 8 ounces; Vitamin E is present preferably in amounts of about 20% to about 80% of the daily value and most preferably in amounts of about 30% to about 70% of the daily value per 8 ounces; Vitamin K is present preferably in amounts of about 20 to about 40% and most preferably about 23 to about 35% of the daily value per 8 fluid ounces; Thiamine is present preferably in amounts of about 20 to about 40% of the daily value and most preferably in amounts of about 23 to about 35% of the daily value per 8 ounces; riboflavin is present preferably in amounts of about 20 to about 40% of the daily value and most preferably in amounts of about 23 to about 35% of the daily values per 8 ounces; niacin is present preferably in amounts of about 20 to about 40% of the daily value and most preferably in amounts of about 23 to about 35% of the daily value per 8 ounces; Vitamin B6 is present preferably in amounts of about 20 to about 40% of the daily value and most preferably in amounts of 23 to about 35% of the daily value per 8 ounces; Folate is present preferably in amounts of about 20 to about 40% of the daily value and most preferably in amounts of 23 to 35% of the daily value per 8 ounces; Vitamin B12 is present preferably in amounts of about 20 to about 40% and most preferably about 23 to about 35% of the daily value per 8 ounces; Biotin is present preferably in amounts of about 20 to about 40% of the daily value and most preferably about 23 to about 35% of the daily value per 8 ounces; and Pantothenic Acid is present preferably in amounts of about 20 to about 40% of the daily value and most preferably about 23 to about 35% of the daily value per 8 ounces. As mentioned, all daily values are based on 2,000 calorie diet per diem and all quantities present in the composition are based on 8 fluid ounces.

With respect to the mineral content in the compositions of the present invention, the following values represent preferred daily value percent contents in 8 fluid ounces: Calcium in amounts of about 20 to about 80% and most preferably about 40 to about 70%; Iron in amounts of about 20 to about 40% and most preferably about 23 to about 35%; Phosphorus in amounts of about 20 to about 40% and most preferably about 23 to about 35%; Iodine in amounts of about 20 to about 40% and most preferably in amounts of about 23 to about 35%; Magnesium in amounts of about 20 to about 40% and most preferably in amounts of about 23 to 35%; Zinc in amounts of about 20 to about 40% and most preferably in amounts of about 23 to about 35%; Selenium in amounts of about 20 to about 40% and most preferably in amounts of about 23 to about 35%; Copper in amount of about 20 to about 40% and preferably in amounts of about 23 to about 35%; Manganese in amounts of about 20 to about 40% and preferably in amounts of 23 to about 35%; Chromium in amounts of about 20 to about 40% and most preferably in amounts of about 23 to about 35%; Molybdenum in amounts of about 20 to about 40% and most preferably in amounts of about 23 to about 35%; and Chloride in amount of about 5 to about 40% and most preferably in amounts of about 10 to about 25% of the daily value per 8 ounces, wherein the daily value is based on 2,000 calorie diet.

Antioxidants useful in the present invention include, without limitation, butylhydroxy anisole (BHA), butylhydroxy toluene (BHT), tertiary butyl hydroquinone (TBHQ), propyl galiate and combinations thereof. Natural antioxidants can also be included through additional amounts of vitamin C, E, beta-carotene, selenium, zinc and combinations thereof. Various herbs, herb extracts, botanicals, botanical extracts, amino acids and the like, and combinations thereof, can also be included for their intended fimctions and various products using such dietary supplements can be formulated therefrom.

Various non-nutritive components can be included in the inventive compositions. For example, fillers, coloring agents, flavors, emulsifiers and the like are useful. Other nutritionally valuable, but non-essential components can be added, including choline, taurine, L-carnitine and the like. Combinations of these non-nutritive and non-essential components are contemplated.

Various nutraceuticals and phytochemicals can be incorporated into the inventive compositions for their intended function and as a treatment for patients with specific disorders.

Such components are typically included when the composition is intended as a medical food or a food for special dietary use. Various pharmaceuticals, such as antibiotics, anti-cancer agents, anti-oxidants and other pharmacologically and bioactive agents may be include for their intended purpose. The standard formulation as set forth in the tables can be augmented with a variety of additional components to specially tailor the composition as a medical food, food for special dietary use or nutritional supplement. Various specialized products can be formulated. For example when the composition is to be used as a food for special dietary use, it can be formulated into a hypoallergenic food. Other foods for special dietary use include infant foods, pediatric foods, geriatric foods, foods for reducing and maintaining weight, foods for diabetics, and foods for those on restricted sodium, fat or protein diets.

Various medical foods can be fashioned from the inventive compositions for cardiovascular patients, cancer patients, neurological patients, cachexia patients, surgery patients, patients with limited respitory functions and chronic obstructive pulmonary disease, as well as those suffering from HIV-Aids, chronic hepatic disease, renal failure, ulcers and other diseases which require special diets. Additional uses for compositions of the present invention includes formulating the inventive compositions into products for diarrhea, constipation, inflammatory bowel disease, chronic pancreatitis, cystic fibrosis, dysphagia as well as other specialized products.

Although the inventive compositions are primarily intended for human use, the compositions can be administered to other animals as a nutritional supplement, food for special dietary use or as a medical food.

The compositions of the present invention are intended to be stored in standard gable top cartons or the like. No specialized hermetic sealing or freezing is required or intended. Products of the present invention therefore do not suffer from the deleterious effects of these processing and storage methods of the prior art.

EXAMPLES

The following six (6) classes of pasteurized and/or ultra-pasteurized complete nutritional compositions, by way of example and not limitation, were prepared:

| Complete Nutritional Composition | Applications |
|---|---|
| 1.) Regular/Standard/Basic | for people who require a general purpose, no-residue, nutritional supplement to maintain good nutritional status. Also for athletic lifestyles, lactose intolerance, and malnutrition |
| 2.) Light/Low-Fat | for people who are on a modified fat diet, restricting their intake of saturated fats and cholesterol, but a requiring normal concentration of protein, vitamins, and minerals |
| 3.) Fat-Free | for people who, for a limited time, can benefit from a completely fat-restricted diet, but require a normal concentration of protein, vitamins, and minerals |
| 4.) High Protein | for people who require additional protein, such as those who are recovering form illness or general surgery or are at risk of pressure ulcers |
| 5.) Plus/Extra Strength | for people who require extra calories and nutrients in a limited volume |
| 6.) With Fiber | for people who can benefit from increased dietary fiber (moderate bowel function, extended inactivity). |

Batching Procedure:

Proper batching is of utmost importance. For preparation of all pasteurized and/or ultra-pasteurized complete nutritional products, the total processing system was cleaned (CIP=Clean-In-Place).

For the preparation of all pasteurized and/or ultra-pasteurized complete nutritional products, high quality, food-grade ingredients were used. Order of addition of ingredients, their physical structure, temperature, and rate of addition are also very important.

Water (or lactose-free skim milk) was the first ingredient to be introduced into the batching container. Although the batch volume could be adjusted at the end of the batching process, it is preferred that the amount of water (or lactose-free skim milk) is precalculated in a way that addition of other ingredients automatically brings the volume of the batch to the desirable level.

Proteins, fats, carbohydrates, minerals, flavors, colors, and vitamins are added sequentially. After the addition of each ingredient, attempts were made to homogenize the mixture before the next ingredient was added to the system.

Upon obtaining a homogeneous batch of unprocessed complete nutritional product with desirable profile of nutrients and functional ingredients, the batch is immediately pasteurized (85° C. for 30 seconds) and/or ultra-pasteurized (135–150° C. for up to 5 seconds). The pasteurized and/or ultra-pasteurized nutritional product is promptly cooled, and continuously kept at refrigerated temperature (1–7° C., preferably 3–4° C.).

Examples 1–4

Pursuing the batching and processing guidelines explained above, four different flavors (vanilla, strawberry, chocolate, banana) of the inventive refrigerated ready-to-drink pasteurized and/or ultra-pasteurized standard complete nutritional compositions were developed. The nutrition facts and the ingredients used for preparation of these products are shown in Table 6.

Examples 5–8

Pursuing the batching and processing guidelines explained above, four different flavors (vanilla, strawberry, chocolate, banana) of the inventive refrigerated ready-to-drink pasteurized and/or ultra-pasteurized light/low-fat complete nutritional compositions were developed. The nutrition facts and the ingredients used for preparation of these products are shown in Table 7.

Examples 9–12

Pursuing the batching and processing guidelines explained above, four different flavors (vanilla, strawberry, chocolate, banana) of the inventive refrigerated ready-to-drink pasteurized and/or ultra-pasteurized fat-free complete nutritional compositions were developed. The nutrition facts and the ingredients used for preparation of these products are shown in Table 8.

Examples 13–16

Pursuing the batching and processing guidelines explained above, four different flavors (vanilla, strawberry, chocolate, banana) of the inventive refrigerated ready-to-drink pasteurized and/or ultra-pasteurized high protein complete nutritional compositions were developed. The nutrition facts and the ingredients used for preparation of these products are shown in Table 9.

Examples 17–20

Pursuing the batching and processing guidelines explained above, four different flavors (vanilla, strawberry, chocolate, banana) of the inventive refrigerated ready-to-drink pasteurized and/or ultra-pasteurized plus complete nutritional compositions were developed. The nutrition facts and the ingredients used for preparation of these products are shown in Table 10.

Examples 21–24

Pursuing the batching and processing guidelines explained above, four different flavors (vanilla, strawberry, chocolate, banana) of the inventive refrigerated ready-to-drink pasteurized and/or ultra-pasteurized with fiber complete nutritional compositions were developed. The nutrition facts and the ingredients used for preparation of these products are shown in Table 11.

Examples 25–28

Pursuing the batching and processing guidelines explained above, four different flavors (vanilla, strawberry, chocolate, banana) of the invention refrigerated ready-to-drink pasteurized and/or ultra-pasteurized standard complete nutritional compositions were developed, using lactose-free milk as the basis of the formulation. The nutrition facts and the ingredients used for preparation of these products are shown in Table 12.

Although this invention has certain preferred embodiments, it will be obvious to those skilled in the art that various changes and modifications may be made therein without departing from the invention, and all such changes and modifications are intended to fall within the true spirit and scope of the invention.

TABLE 1

The list of nutritionally essential macro nutrients and micro nutrients (13 vitamins and 14 minerals), as described in the Code of Federal Regulation (21 CFR 101.9, 1996).

| Essential Nutrient | 100% (D.V.)* |
|---|---|
| Total Fat | 65 g |
| Saturated Fat | 20 g |
| Cholesterol | 300 mg |
| Sodium | 2,400 mg |
| Potassium | 3,500 mg |
| Total Carbohydrate | 300 g |
| Dietary Fiber | 25 g |
| Sugars | |
| Protein | 50 g |
| Vitamin A | 5,000 IU* |
| (Beta Carotene) | (as % of vitamin A) |
| Vitamin C | 60 mg |
| Calcium | 1,000 mg |
| Iron | 18 mg |
| Vitamin D | 400 IU** |
| Vitamin E | 30 IU** |
| Vitamin K | 80 mcg |
| Thiamine (Vitamin B1) | 1.5 mg |

TABLE 1-continued

The list of nutritionally essential macro nutrients and micro nutrients (13 vitamins and 14 minerals), as described in the Code of Federal Regulation (21 CFR 101.9, 1996).

| Essential Nutrient | 100% (D.V.)* |
|---|---|
| Riboflavin (Vitamin B2) | 1.7 mg |
| Niacin | 20 mg |
| Vitamin B6 | 2.0 mg |
| Folate | 400 mcg |
| Vitamin B12 | 6.0 mcg |
| Biotin | 300 mcg |
| Pantothenic Acid | 10 mg |
| Phosphorus | 1,000 mg |
| Iodine | 150 mcg |
| Magnesium | 400 mg |
| Zinc | 15 mg |
| Selenium | 70 mcg |
| Copper | 2.0 mg |
| Manganese | 2.0 mg |
| Chromium | 120 mcg |
| Molybdenum | 75 mcg |
| Chloride | 3,400 mg |

*) Percent Daily Values are based on a 2,000 calorie diet.
**) 1 International Unit (IU) of vitamin A = 0.3 mcg of all-trans retinol = 0.6 mcg of all trans beta-carotene
1 International Unit (IU) of vitamin D = 0.025 mcg cholecalciferol
1 International Unit (IU) of vitamin E = 1 mg of all-rac-alpha Tocopherol acetate

TABLE 2

Sterilized, non-refrigerated/shelf-stable nutritional supplements, foods for special dietary use, and medical foods, currently available in the market.

| Supplier/Product | Nutritional Product Designed for, Provided for, Indicated for |
|---|---|
| Ross Products Div., Abbott Labs: | |
| Advera ® | People with HIV or AIDS |
| Ensure ® | Low residue liquid food for general purpose, maintaining good nutritional status, to help stay healthy, energetic and active, and in preparation for barium enema X-ray, colonoscopy or colon surgery |
| Ensure ® High Protein | Patients who require additional nutrients such as patients recovering from general surgery or hip fracture, patients at risk of pressure ulcers, and patients on modified fat diets |
| Ensure ® HN | Nutrient-dense, high protein, low-residue liquid food for patients with caloric requirements of less than 2000 Cal/day, or patients with increased protein requirements |
| Ensure Plus ® | A high-calorie liquid food for use when extra calories and nutrients, but a normal concentration of protein, are needed in limited volume |
| Ensure Plus ® HN | A high-calorie, high-protein, iow-residue liquid food for patients with increased calorie and protein need, or for patients with limited volume tolerance |
| Ensure ® With Fiber | Fiber-fortified liquid food for people who can benefit from increased dietary fiber and nutrients, and to help moderate bowel function. |
| Ensure ® Light Glucerna ® | To enhance blood glucose response in person with abnormal glucose tolerance (Type I and Type 11 diabetes mellitus, and stress-induced hyperglycemia) |
| Introlite ™ | Half-calorie liquid food used to initiate tube feeding or as an adjunct to a full strength fonnula when low calorie intake is desired |
| Jevity ® | Long- or short-tenn tube feeding, can help moderate bowel function and may be useful in the dietary management of diarrhea and constipation |
| Nepro ® | Specifically designed for the dialyzed patient with chronic or acute renal failure |
| Osmolite ® | Tube-feeding patients sensitive to hyperosmolar feeding. For patients experiencing altered taste perception |

TABLE 2-continued

Sterilized, non-refrigerated/shelf-stable nutritional supplements, foods for special dietary use, and medical foods, currently available in the market.

| Supplier/ Product | Nutritional Product Designed for, Provided for, Indicated for |
|---|---|
| Osmolite ® HN | Tube-feeding patients with caloric requirements of less than 2000 Cal per day or for patients with elevated nitrogen requirements. For oral feeding for patients experiencing altered taste perception |
| PediaSure ® | Genera-purpose liquid food for chrildren 1 to 10 years of age |
| PediaSure ® With Fiber | Fiber-enriched, Genera-purpose liquid food for children 1 to 10 years of age |
| Perative ® | Metabolically stressed patients with injuries such as multiple fracture, wounds, burns, surgery, and the associated conditions of hypermetabolism and susceptibility to sepsis |
| Promote ® | Patients who need a higher proportion of calories form protein such as: patients with low calorie requirements, pressure ulcers, and institutional or homebound individuals at risk for protein-energy malnutrition |
| Promote ® Fiber | Patients who need a higher proportion of calories from protein such as: patient with low calorie requirements, pressure ulcers, and institutional or homebound individuals at risk for protein-energy mainutrition |
| Pulmocare ® | To reduce carbon dioxide production, thereby minimizing $CO_2$ retention resulting from chronic obstructive pulmonary disease, cystic fibrosis or respiratory failure. Appropriate for ambulatory or ventiator-dependent patients |
| Suplena ® | The predialyzed patients with chronic or acute renal failure |
| TwoCal ® HN | Patients with elevated energy and protein requirements, or patients who need minimal volume to accommodate fluid restrictions |
| Similac ® | |
| Isomile ® | |
| Isomil ® DF | A soy product specially formulated for infants with diarrhea |
| Alimentum ® | A hydrolyzed protein formula for infants with severe milk allergies |
| Toddler's Best ® | Nutritional beverage with iron for toddlers 12 months of age and older |
| Mead Johnson, Bristol-Myers Squibb: | |
| Boost ® | Healthy, active, but nutritionally overextended, Temporarily nutritionally atrisk due to conditions such as pregnancy, lactation, anemia, and recovery after surgery, Additional nutritional needs such as athletic lifestyles, eating disorders, chronic dieters, etc., Special dietary needs such as lactose intolerance, rheumatoid arthritis, multiple sclerosis, lupus, etc., Patients who need to rely completely on a nutritional beverage to help maintain their current weight or as a meal replacement to help patients lose weight |
| Criticare HN ® | Inflammatory bowel disease, Short-gut syndrome, Transition from TPN to enteral therapy, Non-specific malabsorptive/maldigestive States, Cystic fibrosis |
| Deliver ® 2.0 | Fluid restrictions (congestive heart failure, neurosurgery, renal dialysis), volume restriction (cardiac or cancer cachexia, COPD), Liver disease, with malnutrition and/or encephalopathy Isocal ® General tube feeding needs, Inadequate voluntary oral intake (cancer, anorexia, stroke), Barrier to nomial ingestion (coma, paralysis, head & neck cancer), Mainutrition, Postoperative alimentation |
| Isocal ® HN | Long-term tube-feeding patients with requirements below 1500 calories per day, Mildly stressed patients with increased protein needs, Nutritionally compromised cancer patients, Patients with postoperative alimentation |
| Liposorb ® Liquid | Fat malabsorption resulting from HIV infection, inflammatory bowel disease, Cystic fibrosis, Short bowel syndrome, Liver disease, Chronic pancreatitis |
| Respalor ® | Limited respiratory function, COPD patients, Ventilator dependent patients such as acute respiratory distress syndrome |
| Sustacal ® BasicTm | Individuals who simply need or want additional nutrients, Patients who require a low-residue supplement with moderate supplement with moderate osmolality, Persons desiring a calorie-controlled supplement for weight control |
| Sustacal ® Liquid | Geriatric patients, Patients recovering from illness or surgery, Malnourished cancer patients needing preoperative and postoperative nutritional support, Patients needing preoperative bowel preparation, Persons with increased nutritional needs (e.g., athletes, pregnant women), Persons desiring weight control, Patients undergoing wound healing (e.g., decubitus ulcer). |
| Sustacal ® Plus | Volume restriction (cancer, cardiac cachexia, chronic obstructive lung disease), Fluid restrictions (congestive heart failure, liver disease), Weight gain requirements due to a variety of medical conditions |
| Sustacal ® With Fiber | Tube-fed patients needing help maintaining bowel regularity, Patients intolerant to low-residue feedings, Persons needing nutritional supplementation where a low-residue diet is not prescribed, Persons needing geriatric supplementation |
| TraumaCal ® | Hypermetabolic States (muitiple trauma, major burns), Ventilator dependency (such as in acute respiratory distress syndrome), Cancer |
| Ultracal ® | General tube feeding needs, Inadequate voluntary oral intake (cancer, Stroke), Barriers to normal ingestion (dysphagia, comatose, head and neck surgery), Tube feeding which requires dietary fiber to normalize bowel function (constipation, diarrhea), glucose intolerance |
| Enfamill ® | Infant formula (concentrated liquid, Ready-to-Use) |
| ProSobee ® | Milk-free soy isolate infant formula |
| Gerber ® Baby Formula | Infant formula |

TABLE 2-continued

Sterilized, non-refrigerated/shelf-stable nutritional supplements, foods for special dietary use, and medical foods, currently available in the market.

| Supplier/Product | Nutritional Product Designed for, Provided for, Indicated for |
|---|---|
| Gerber ® Soy Formula | Infant formula |
| Lactofree ® | Infants who experience common feeding problems associate with lactose |
| Nutramigen ® | Hypoallergenic protein hydrolyzate infant formula |
| Pregestimil ® | Hypoallergenic protein hydrolyzate formula with MCT |
| Next Step ™ | Follow-up infant formula |
| Sandoz Nutrition: | |
| Compleat ® Modified | Semi-synthetic formula related intolerance such as diarrhea, abdominal distention, constipation, nausea, Diabetes mellitus, Pressure ulcers, Lactose intolerance, Select drug-nutrient incompatibilities, Long-term tube feeding |
| Compleat ® | Semi-synthetic formula related intolerance such as diarrhea, abdominal distention, constipation, and nausea, Diabetes mellitus, Long-term tube feeding, Select drug-nutrient incompatibilities, Pressure ulcers |
| DiabetiSource ® | Diabetes mellitus Type I and Type 11, Stress-induced hyperglycemia |
| FiberSource ® | Abnormal bowel function, Extended inactivity, Neurological impairment, Developmentally disabled, Long-term tube feeding |
| FiberSource ™ HN | Abnormal bowel function, Neurological impairment, Developmentally disabled, Long-term tube feeding, Elevated protein requirements, Extended inactivity |
| Impact ® | Trauma, Major Surgery, Sepsis, Cancer, Ventilator dependent, Burn injury |
| Impact ® 1.5 Cal | Critically ill patients who are fluid restricted or have high calorie needs, Burn injury, Trauma Major Surgery, Sepsis, Ventilator dependent |
| Impact ® with Fiber | Trauma, Major Surgery, Sepsis, Cancer, Ventilator dependent, Burn injury |
| IsoSource ® Std. | Standard tube feeding, Inadequate oral intake, Mainutrition, Pre- and postoperative, Transitional feeding |
| IsoSource ® HN | Elevated Protein requirements, Inadequate oral intake, Malnutrition, Pre- and postoperative, Transitional feeding |
| IsoSource ® VHN | Increased protein requirements, Pressure ulcers, Post surgery/wound healing, Calorie restriction, Long-term tube feeding |
| IsoSource ® 1.5 Cal | Pulmonary conditions, Respiratory failure or distress/ARDS, Cardiac/congestive heart failure, Cancer cachexia, Renal/Hepatic, Stroke/neurosurgery, Volume intolerance, Elevated caloric and protein needs, Malnutrition, Surgery, Rehabilitation, Shortened feeding Schedules |
| Resource ® Diabetic | Diabetes Mellitus Type I and Type 11, Stress-induced hyperglycemia |
| Resource ® Fruit Beverage | Oncology, Geriatrics, Cerebrovascuiar accident (CVA), Oral surgery, Bowel preparation, Anorexia, protein-calorie malnutrition, Pressure Ulcers, Pre- and postoperative, Fat-malabsorption |
| Resource ® Std. | Cancer, Pressure ulcers, Cerebrovascular accident (CVA), Oral surgery, Geriatrics, Protein-calorie malnutrition, Pre- and postoperative, Anorexia |
| Resource ® Plus | Cancer, Pressure ulcers, Cerebrovascular accident (CVA), Oral surgery, Geriatrics, Protein-calorie malnutrition, Pre- and postoperative, Anorexia |
| SandoSource ® | Bowel resection, Malabsorption syndrome, Select trauma/surgery, Grohn's eptidedisease, GI enterocutaneous fistula, Pancreatic disorders, Early postoperative feeding, Short bowel syndrome, GI disorders related to AIDS |
| Resource ® Just for Kids | Acute needs while supporting growth development |
| Clintec Nutrition Company: | |
| Carnation ® Instant Breakfast | Ready-to Drink Milk-based liquid supplement |
| Crucial ® | High-calorie, high-protein elemental diet for nutritional support of the critically ill patients |
| GlytrolTm | A balanced formulation for patients with hyperglycemia |
| NuBasics ™ | Complete nutrition drink, appropriate for low-sodium, low-cholesterol, and carbohydrate-controlled diets |
| NuBasics ™ with Fiber | Complete nutrition drink, appropriate for low-sodium, low-cholesterol, and carbohydrate-controlled diets |
| NuBasics ® VHP | Complete very high protein nutrition drink, appropriate for low-sodium, low cholesterol, and carbohydrate-controlled diets |
| NuBasics ™ Plus | Complete high calorie nutrition drink, appropriate for low-sodium, low cholesterol, and carbohydrate-controlled diets |
| Nutren ® 1.0 | Complete liquid nutrition |
| Nutren ® 1.0 with Fiber | Complete liquid nutrition |
| Nutren ® 1.5 with Fiber | Complete high calorie liquid nutrition |
| Nutren ® 2.0 | Complete calorically dense liquid nutrition |
| NutriHep ® | Enteral Nutrition for Hepatic patients |

TABLE 2-continued

Sterilized, non-refrigerated/shelf-stable nutritional supplements, foods for special dietary use, and medical foods, currently available in the market.

| Supplier/Product | Nutritional Product Designed for, Provided for, Indicated for |
|---|---|
| NutriVent ® | Complete nutrition for pulmonary patients |
| Peptamen ® Oral | Complete elemental diet for children |
| Peptamen VHP ™ | Complete elemental diet very high protein elemental diet elemental diet for children liquid nutrition for the mature adults use balanced liquid enteral nutrition use balanced hquidenteral nutrition complete, isotonic formula for tube feeding complete, high caloric density formula for oral and tube feeding complete, high caloric density formula for oral and tube feeding complete formula when a starter tube feeding is indicated complete, isotonic high fiber tube feeding formula complete, high protein tube feeding formula with fiber complete, blenderized tube feeding formula |
| Peptamen Junior ™ | Complete elemental diet for children |
| ProBalance ™ | Complete liquid nutrition for the mature adults |
| Reabilan ® | Ready to use balanced liquid enteral nutrition |
| Reabilan ® HN | Ready to use balanced liquid enteral nutrition |
| Replete ™ | Complete high protein liquid nutrition for healing support |
| Replete ™ w/Fiber | Complete high protein liquid nutrition for healing support |
| Sherwood Medical: | |
| Attain ® | Nutritionally complete, isotonic formula for tube feeding |
| Comply ® | Nutritionally complete, high caloric density formula for oral and tube feeding |
| Magtiacal ® | Nutritionally complete, high caloric density formula for oral and tube feeding |
| Pre-Attain ® | Nutritionally complete, formula when a starter tube feeding is indicated |
| Profiber ® | Nutritionally complete, isotonic high fiber tube feeding formula |
| Protain XL ® | Nutritionally complete, high protein tube feeding formula with fiber |
| Vitaneed ® | Nutritionally complete, blenderized tube feeding formula |
| Elan Pahrama, Nutrition Division: | |
| Nutrilan ® | Nutritionally complete and balanced meal replacement formula |
| Isolan ™ | Isotonic complete liquid nutrition |
| Nitrolan ™ | High nitrogen complete liquid nutrition |
| Ultralan ™ | One and half strength complete liquid nutrition |
| Fiberlan ™ | High fiber complete liquid nutrition |
| Nestle Food Co.: | |
| Sweet Success ™ | Healthy shake, quick low fat meal, weight loss |
| Slim-Fast Foods Company: | |
| Ultra Slim-Fast ® | Lose Weight Feel Great, Ready to drink meal for breakfast and lunch |

TABLE 3

Examples of commercially available ultra-pasteurized or pasteurized nutritional products which are out-of-the scope of present invention (regular milk shakes and flavored milks, as ordinary foods, are not shown)

| Product | Reason for being out-of-the-scope of present invention |
|---|---|
| Supplier/Producer: Sandoz Nutrition | |
| Resource ® Shake (vanilla & Strawberry) | Frozen (not Ready-To-Drink at the point of purchase, needs thawing at refrigerator for 24 hours) |
| Resource ® Shake Puls (vanilla & Strawberry) | Frozen (not Ready-To-Drink at the point of purchase, needs thawing at refrigerator for 24 hours) |
| Resource ® Delmark ® Health Shake (vanilla) | Frozen (not Ready-To-Drink at the point of purchase, needs thawing at refrigerator for 24 hours) |
| Resource ® Nutritious Juice Drink (orange & apple cranberry) | Frozen (not Ready-To-Drink at the point of purchase, needs thawing at refrigerator for 24 hours) |
| Supplier/Producer: Diamond Crystal Menu Magic | |
| Mighty Shakes ™ (vanilla, Strawberry, orange cream, chocolate, egg nog, etc.) | Frozen (not Ready-To-Drink at the point of purchase, needs thawing at refrigerator for 24 hours) |
| Supplier/Producer: Nutra/Balance Products | |
| Nutra/Shake ® High | Frozen (not Ready-To-Drink at the point of purchase, needs thawing at |

TABLE 3-continued

Examples of commercially available ultra-pasteurized or pasteurized nutritional products which are out-of-the scope of present invention (regular milk shakes and flavored milks, as ordinary foods, are not shown)

| Product | Reason for being out-of-the-scope of present invention |
|---|---|
| Calorie Dairy Shake (vanilla, Strawberry, chocolate, lemon) | refrigerator for 24 hours) |
| Low Lactose Nutra/Shake ® (vanilla, Strawberry, chocolate) | Frozen (not Ready-To-Drink at the point of purchase, needs thawing at refrigerator for 24 hours) |
| High Fiber Nutra/Shake ® (vanilla, Strawberry, chocolate) | Frozen (not Ready-To-Drink at the point of purchase, needs thawing at refrigerator for 24 hours) |
| Citrus Nutra/Shake ® (Strawberry, pineapple orange chocolate, peach, sugar-free orange) | Frozen (not Ready-To-Drink at the point of purchase, needs thawing at refrigerator for 24 hours) |
| Re/Neph Renal Nutrition (vanilla, Strawberry, chocolate) | Frozen (not Ready-To-Drink at the point of purchase, needs thawing at refrigerator for 24 hours) |
| Nu/Taste Milk Replacement hours) | Frozen (not Ready-To-Drink at the point of purchase, needs thawing at refrigerator for 24 |
| Nutra/Shake ® Free (vanilla, coffee, chocolate decaffeinated sugar-free) | Frozen (not Ready-To-Drink at the point ofpurchase, needs thawing at refrigerator for 24 hours) |
| Lact/Care ® (vanilla, Strawberry, chocolate) Supplier/Producer: H.P. Hood. Inc. (under license from Lactaid ® Inc.) | Frozen (not Ready-To-Drink at the pomt of purchase, needs thawing at refrigerator for 24 hours) |
| Lactaid ® Lactose Reduced milk & chocolate milk Supplier/Producer: Mendenhall Laboratories | Incomplete Nutritional Profile (deficient in Potassium, Vitamin E, Vitamin K, Vitamin B1, Vitamin B2, Niacin, Vitamin B6, Folate, Vitamin B12, Biotin, Pantothenic Phosphorus, Iodine, Magnesium, Zinc, Selenium, Copper, Manganese, Chromium, Molybdenum, and Chloride) |
| Skim Delux (milk, calcium chocolate milk and shakes) Supplier/Producer: Diehl Specialties International | Incomplete Nutritional Profile (deficient in Potassium, Vitamin E, fortified Vitamin K, Vitamin B1, Vitamin B2, Niacin, Vitamin B6, Folate, Vitamin milk B12, Biotin, Pantothenic Acid, Phosphorus, Iodine, Magnesium, Zinc, Selenium, Copper, Manganese, Chromium, Molybdenum, and Chloride) |
| Vitamite ® Non-Dairy Beverage (2% fat, non-fat, chocolate) milk substitute | Incomplete Nutritional Profile. It is a self-defined miik substitute. (deficient in Vitamin E, Vitamin K, Niacin, Folate, Biotin, Iodine, Magnesium, Zinc, Selenium, Copper, Manganese, Chromium, Molybdenum, and Chloride) |

TABLE 4

The source and quantity of each vitamin (in the vitamin premix) to be used in the inventive standard complete nutritional composition.

| VITAMIN PREMIX | UNIT | LABEL CLAIM UNITS/LITER | FOOD-GRADE SOURCE/COMPOUND | SOURCE TO VITAMIN CONVERSION FACTOR | PROCESSING & STORAGE OVERDOSE | EXACT, REQURIED QUANTITY OF SOURCE/ COMPOUND | UNIT |
|---|---|---|---|---|---|---|---|
| Vitamin A: | | | | | | | |
| (75% As Vitamin A) | IU | 3966 | Vitamin A Palmitate | 1.9 | 1.2 | 9042.48 | IU |
| (25% As Beta Carotene) | mcg | 794 | Beta Carotene | 1 | 1.1 | 873.4 | mcg |
| Vitamin C | mg | 127 | Sodium Ascorbate | 1.12 | 2 | 284.48 | mg |
| Vitamin D | lu | 423 | Vitamin D3 (cholecalciferol) | 1 | 1.2 | 507.6 | IU |
| Vitamin E | IU | 32 | alpha-tocopheryl acetate | 1 | 1.2 | 38.4 | IU |
| Vitamin K | mcg | 85 | Phylloquinone (phytonadione) | 1 | 1.1 | 93.5 | mcg |
| Thiamine | mg | 1.6 | Thiamin monoitrate | 1 | 1.2 | 1.92 | mg |
| Riboflavin | mg | 1.8 | Riboflavin | 1 | 1.2 | 2.16 | mg |
| Niacin | mg | 21.2 | Niacinamide | 1 | 1.1 | 23.32 | mg |
| Vitamin B6 | mg | 2.2 | Pyridoxine hydrochloride | 1.21 | 1.2 | 3.1944 | mg |
| Folate | mcg | 423 | Folic Acid | 1 | 1.2 | 507.6 | mcg |
| Vitamin B12 | mcg | 6.4 | Cyanocobalamin | 1 | 1.2 | 7.68 | mcg |

TABLE 4-continued

The source and quantity of each vitamin (in the vitamin premix) to be used in the inventive standard complete nutritional composition.

| VITAMIN PREMIX | UNIT | LABEL CLAIM UNITS/LITER | FOOD-GRADE SOURCE/COMPOUND | SOURCE TO VITAMIN CONVERSION FACTOR | PROCESSING & STORAGE OVERDOSE | EXACT, REQURIED QUANTITY OF SOURCE/ COMPOUND | UNIT |
|---|---|---|---|---|---|---|---|
| Biotin | mcg | 318 | Biotin | 1 | 1.2 | 381.6 | mcg |
| Pantothenic Acid | mg | 10.6 | Calcium Pantothenate | 1.09 | 1.2 | 13.8648 | mg |

1 international Unit (IU) of vitamin A = 0.3 mcg of all-trans retinol = 0.6 mcg of all-trans beta-carotene
1 international Unit (IU) of vitamin D = 0.025 mcg cholecalciferol
1 international Unit (IU) of vitamin E = 1 mg of all-rac-alpha Tocopherol acetate
Vitamin A Palmitate (Retinol Pabnitate) M.W. = (286.4 + 256.4 = 542.8)
Theoretically, the Conversion Factor for Vitamin A Palmitate to Vitamin A is 542.8/286.4 = 1.9
For Vitamin A (Retinol), 1 IU = 0.3 mcg, or, 3.3 IU/mcg, or, 3.3 million IU/g
Commercial Vitamin A Palmitate comes in 1.7 million IU/gram, or, 1.7 IU/mcg
Therefore, the ratio of activity of Vitamin A to the commercial Vitamin A Palmitate is 3.3/1.7 = 1.9

TABLE 5

The source and quantity of each mineral (in the mineral premix) to be used in the inventive standard complete nutritional composition.

| MINERALS PREMIX | UNIT | LABEL CLAIM UNITS/LITER | FOOD-GRADE SOURCE/COMPOUND | MOL. WT. | SOURCE TO MINERAL CONVERSION FACTOR | EXACT, REQUIRED QUANTITY OF SOURCE/COMPOUND | UNIT |
|---|---|---|---|---|---|---|---|
| Sodium | | | | | | | |
| Potassium | | | | | | | |
| Calcium | | | | | | | |
| Iron | mg | 19 | Ferrous Sulfate (FeSO$_4$.7 H$_2$O) | 278 | 4.98 | 94.62 | mg |
| Phosphorus | | | | | | -0- | |
| Iodine | mcg | 159 | Potassium Iodide (KI), anhydrous | 166 | 1.31 | 208.29 | mcg |
| Magnesium | | | | | | -0- | |
| Zinc | mg | 15.9 | Zinc Sulfate (ZnSO$_4$.1H$_2$O) | 179.44 | 2.76 | 43.884 | mg |
| Selenium | mcg | 74 | Sodium Selenate (Na$_2$SeO$_4$), anhydrous | 188.9 | 2.4 | 177.6 | mcg |
| Copper | mg | 2.12 | Cupric Sulfate (CuSO$_4$), anhydrous | 159.6 | 2.51 | 5.3212 | mg |
| Manganese | mg | 2.12 | Manganese Sulfate (MnSO$_4$.1H$_2$O), anhydrous | 169 | 3.07 | 6.5084 | mg |
| Chromium | mcg | 127 | Chromium Chloride [Cr(H$_2$O)$_4$Cl$_2$].2H$_2$O | 266.45 | 5.12 | 650.24 | mcg |
| Molybdenum | mcg | 79.4 | Sodium Molybdate (Na$_2$MoO$_4$.2H$_2$O) | 241.95 | 2.52 | 200.088 | mcg |
| Chloride | | | | | | | |

TABLE 6

The Nutrition Facts and Ingredients used for the preparation of the inventive refrigerated ready-to-drink (RTD) pasteurized and/or ultra-pasteurized standard nutritional composition (Vanilla Flavor):

| Nutrition Facts | % Daily Value* | Ingredients |
|---|---|---|
| Serving Size: 8 fl oz. | | Water |
| Amount per Serving | | Corn Syrup solids |
| Calories 250 | | Sugar (sucrose) |
| Calories from Fat 47 | | Calcium Caseinate |
| Total Fat 5.2 g | 8% | Canola Oil |
| Saturated Fat 0.5 g | 3% | Milk Protein Concentrate |
| Cholesterol 5 mg | 2% | Natural & Artificial Flavor |
| Sodium 140 mg | 6% | Isolated Soy Proteins |
| Potassium 400 mg | 11% | Corn Oil |
| Total Carbohydrate 40.8 g | 14% | Potassium Phosphates |
| Dietary Fiber 0 g | 0% | Magnesium Chloride |
| Sugars 8.5 g | | Soy Lecithin |
| Protein 10 g | 20% | Calcium Citrate |
| Vitamin A, | 25% | Sodium Chloride |
| (25% as Beta Carotene) | | Sodium Phosphate |
| Vitamin C | 50% | Sodium Ascorbate |
| Calcium | 50% | Carrageenan |
| Iron | 25% | Ferrous Sulfate |
| Vitamin D | 25% | Zinc Sulfate |
| Vitamin E | 50% | Vitamin E (aplha-tocopheryl acetate) |
| Vitamin K | 25% | Niacinamide |
| Thiamine | 25% | Calcium Pantothenate |

TABLE 6-continued

The Nutrition Facts and Ingredients used for the preparation of the inventive refrigerated ready-to-drink (RTD) pasteurized and/or ultra-pasteurized standard nutritional composition (Vanilla Flavor):

| Nutrition Facts | % Daily Value* | Ingredients |
| --- | --- | --- |
| Riboflavin | 25% | Maganese Sulfate |
| Niacin | 25% | Copper Sulfate |
| Vitamin B6 | 25% | Vitamin A Palmitate |
| Folate | 25% | Pyridoxine hydrochloride |
| Vitamin B12 | 25% | Vitamin B2 (Riboflavin) |
| Biotin | 25% | Vitamin B1 (Thiamin monoitrate) |
| Pantothenic Acid | 25% | Beta Carotene |
| Pbosphorus | 25% | Chromium Chloride |
| Iodine | 25% | Folic Acid |
| Magnesium | 25% | Biotin |
| Zinc | 25% | Potassium Iodide |
| Selenium | 25% | Sodium Molybdate |
| Copper | 25% | Sodium Selenate |
| Manganese | 25% | Vitamin K1 (Phytonadione) |
| Chromium | 25% | Vitamin D3 (Cholecalciferol) |
| Molybdenum | 25% | Vitamin B12 (Cyanocobalamin) |
| Chloride | 12% | |

*) Percent Daily Values are based on a 2,000 calorie diet.

TABLE 7

The Nutrition Facts and Ingredients used for the preparation of the inventive refrigerated ready-to-drink (RTD) pasteurized and/or ultra-pasteurized light/low-fat nutritional composition (Vanilla Flavor)

| Nutrition Facts | % Daily Value* | Ingredients |
| --- | --- | --- |
| Serving Size: 8 fl oz. | | Water |
| Amount per Serving | | Corn Syrup solids |
| Calories 200 | | Calcium Caseinate |
| Calories from Fat 17 | | Sugar (sucrose) |
| Total Fat 1.9 g | 3% | Milk Protein Concentrate |
| Saturated Fat 0.1 g | 1% | Natural & Artificial Flavor |
| Cholesterol 1 mg | 1% | Canola Oil |
| Sodium 140 mg | 6% | Isolated Soy Proteins |
| Potassium 400 mg | 11% | Potassium Phosphates |
| Total Carbohydrate 36.8 g | 12% | Magnesium Chloride |
| Dietary Fiber 0 g | 0% | Corn Oil |
| Sugars 7.5 g | | Calcium Citrate |
| Protein 10 g | 20% | Sodium Chloride |
| Vitamin A, | 25% | Soy Lecithin |
| (25% as Beta Carotene) | | Sodium Phosphate |
| Vitamin C | 50% | Sodium Ascorbate |
| Calcium | 50% | Carrageenan |
| Iron | 25% | Ferrous Sulfate |
| Vitamin D | 25% | Zinc Sulfate |
| Vitamin E | 50% | Vitamin E (aplha-tocopheryl acetate) |
| Vitamin K | 25% | Niacinamide |
| Thiamine | 25% | Calcium Pantothenate |
| Riboflavin | 25% | Maganese Sulfate |
| Niacin | 25% | Copper Sulfate |
| Vitamin B6 | 25% | Vitamin A Palmitate |
| Folate | 25% | Pyridoxine hydrochloride |
| Vitamin B12 | 25% | Vitamin B2 (Riboflavin) |
| Biotin | 25% | Vitamin B1 (Thiamin monoitrate) |
| Pantothenic Acid | 25% | Beta Carotene |
| Pbosphorus | 25% | Chromium Chloride |
| Iodine | 25% | Folic Acid |
| Magnesium | 25% | Biotin |
| Zinc | 25% | Potassium Iodide |
| Selenium | 25% | Sodium Molybdate |
| Copper | 25% | Sodium Selenate |
| Manganese | 25% | Vitamin K1 (Phytonadione) |
| Chromium | 25% | Vitamin D3 (Cholecalciferol) |
| Molybdenum | 25% | Vitamin B12 (Cyanocobalamin) |
| Chloride | 12% | |

*) Percent Daily Values are based on a 2,000 calorie diet.

TABLE 8

The Nutrition Facts and Ingredients used for the preparation of the inventive refrigerated ready-to-drink (RTD) pasteurized and/or ultra-pasteurized fat free nutritional composition (Vanilla Flavor)

| Nutrition Facts | % Daily Value* | Ingredients |
|---|---|---|
| Serving Size: 8 fl oz. | | Water |
| Amount per Serving | | Corn Syrup solids |
| Calories 180 | | Calcium Caseinate |
| Calories from Fat 0 | | Sugar (sucrose) |
| Total Fat 0 g | 0% | Milk Protein Concentrate |
| Saturated Fat 0 g | 0% | Canola Oil |
| Cholesterol 0 mg | 0% | Natural & Artificial Flavor |
| Sodium 140 mg | 6% | Isolated Soy Proteins |
| Potassium 400 mg | 11% | Potassium Phosphates |
| Total Carbohydrate 35 g | 12% | Magnesium Chloride |
| Dietary Fiber 0 g | 0% | Calcium Citrate |
| Sugars 7.1 g | | Sodium Chloride |
| Protein 10 g | 20% | Sodium Phosphate |
| Vitamin A, | 25% | Sodium Ascorbate |
| (25% as Beta Carotene) | | Carrageenan |
| Vitamin C | 50% | Ferrous Sulfate |
| Calcium | 50% | Zinc Sulfate |
| Iron | 25% | Vitamin E (aplha-tocopheryl acetate) |
| Vitamin D | 25% | Niacinamide |
| Vitamin E | 50% | Calcium Pantothenate |
| Vitamin K | 25% | Maganese Sulfate |
| Thiamine | 25% | Copper Sulfate |
| Riboflavin | 25% | Vitamin A Palmitate |
| Niacin | 25% | Pyridoxine hydrochloride |
| Vitamin B6 | 25% | Vitamin B2 (Riboflavin) |
| Folate | 25% | Vitamin B1 (Thiamin monoitrate) |
| Vitamin B12 | 25% | Beta Carotene |
| Biotin | 25% | Chromium Chloride |
| Pantothenic Acid | 25% | Folic Acid |
| Pbosphorus | 25% | Biotin |
| Iodine | 25% | Potassium Iodide |
| Magnesium | 25% | Sodium Molybdate |
| Zinc | 25% | Sodium Selenate) |
| Selenium | 25% | Vitamin K1 (Phytonadione |
| Copper | 25% | Vitamin D3 (Cholecalciferol) |
| Manganese | 25% | Vitamin B12 (Cyanocobalamin) |
| Chromium | 25% | |
| Molybdenum | 25% | |
| Chloride | 12% | |

*) Percent Daily Values are based on a 2,000 calorie diet.

TABLE 9

The Nutrition Facts and Ingredients used for the preparation of the inventive refrigerated ready-to-drink (RTD) pasteurized and/or ultra-pasteurized high protein nutritional composition (Vanilla Flavor)

| Nutrition Facts | % Daily Value* | Ingredients |
|---|---|---|
| Serving Size: 8 fl oz. | | Water |
| Amount per Serving | | Corn Syrup solids |
| Calories 225 | | Calcium Caseinate |
| Calories from Fat 47 | | Sugar (sucrose) |
| Total Fat 5.2 g | 8% | Milk Protein Concentrate |
| Saturated Fat 0.5 g | 3% | Natural & Artificial Flavor |
| Cholesterol 5 mg | 2% | Isolated Soy Proteins |
| Sodium 120 mg | 5% | Potassium Phosphates |
| Potassium 290 mg | 8% | Magnesium Chloride |
| Total Carbohydrate 29.3 g | 10% | Caicium Citrate |
| Dietary Fiber 0 g | 0% | Sodium Chloride |
| Sugars 8.5 g | | Sodium Phosphate |
| Protein 15 g | 30% | Sodium Ascorbate |
| Vitamin A, | 25% | Carrageenan |
| (25% as Beta Carotene) | | Ferrous Sulfate |
| Vitamin C | 50% | Zinc Sulfate |
| Calcium | 50% | Vitamin E (aplha-tocopheryl acetate) |
| Iron | 25% | Niacinamide |
| Vitamin D | 25% | Calcium Pantothenate |
| Vitamin E | 50% | Maganese Sulfate |
| Vitamin K | 25% | Copper Sulfate |

TABLE 9-continued

The Nutrition Facts and Ingredients used for the preparation
of the inventive refrigerated ready-to-drink (RTD) pasteurized and/or
ultra-pasteurized high protein nutritional composition (Vanilla Flavor)

| Nutrition Facts | % Daily Value* | Ingredients |
| --- | --- | --- |
| Thiamine | 25% | Vitamin A Palmitate |
| Riboflavin | 25% | Pyridoxine hydrochloride |
| Niacin | 25% | Vitatnin B2 (Riboflavin) |
| Vitamin B6 | 25% | Vitamin B1 (Thiamin monoitrate) |
| Folate | 25% | Beta Carotene |
| Vitamin B12 | 25% | Chromium Chloride |
| Biotin | 25% | Folic Acid |
| Pantothenic Acid | 25% | Biotin |
| Pbosphorus | 25% | Potassium Iodide |
| Iodine | 25% | Sodium Molybdate |
| Magnesium | 25% | Sodium Selenate |
| Zinc | 25% | Vitamin K1 (Phytonadione) |
| Selenium | 25% | Vitamin D3 (Cholecalciferol) |
| Copper | 25% | Vitamin B12 (Cyanocobalamin) |
| Manganese | 25% | |
| Chromium | 25% | |
| Molybdenum | 25% | |
| Chloride | 11% | |

TABLE 10

The Nutrition Facts and Ingredients used for the preparation
of the inventive refrigerated ready-to-drink (RTD) pasteurized and/or
ultra-pasteurized plus nutritional composition (Vanilla Flavor)

| Nutrition Facts | % Daily Value* | Ingredients |
| --- | --- | --- |
| Serving Size: 8 fl oz. | | Water |
| Amount per Serving | | Corn Syrup solids |
| Calories 350 | | Sugar (sucrose) |
| Calories from Fat 66 | | Calcium Caseinate |
| Total Fat 7.3 g | 11% | Canola Oil |
| Saturated Fat 0.7 g | 4% | Milk Protein Concentrate |
| Cholesterol 7 mg | 2% | Natural & Artificial Flavor |
| Sodium 200 mg | 8% | Isolated Soy Proteins |
| Potassium 640 mg | 18% | Corn Oil |
| Total Carbohydrate 57.1 g | 19% | Potassium Phosphates |
| Dietary Fiber 0 g | 0% | Magnesium Chloride |
| Sugars 10.6 g | | Soy Lecithin |
| Protein 14 g | 28% | Calcium Citrate |
| Vitamin A, | 35% | Sodium Chloride |
| (25% as Beta Carotene) | | Sodium Phosphate |
| Vitamin C | 70% | Sodium Ascorbate |
| Calcium | 70% | Carrageenan |
| Iron | 35% | Ferrous Sulfate |
| Vitamin D | 35% | Zinc Sulfate |
| Vitamin E | 70% | Vitamin E (aplha-tocopheryl acetate) |
| Vitamin K | 35% | Niacinamide |
| Thiamine | 35% | Calcium Pantothenate |
| Riboflavin | 35% | Maganese Sulfate |
| Niacin | 35% | Copper Sulfate |
| Vitamin B6 | 35% | Vitamin A Palmitate |
| Folate | 35% | Pyridoxine hydrochloride |
| Vitamin B12 | 35% | Vitamin B2 (Riboflavin) |
| Biotin | 35% | Vitamin B1 (Thiamin monoitrate) |
| Pantothenic Acid | 35% | Beta Carotene |
| Phosphorus | 35% | Chromium Chloride |
| Iodine | 35% | Folic Acid |
| Magnesium | 35% | Biotin |
| Zinc | 35% | Potassium Iodide |
| Selenium | 35% | Sodium Molybdate |
| Copper | 35% | Sodium Selenate |
| Manganese | 35% | Vitamin K1 (Phytonadione) |
| Chromium | 35% | Vitamin D3 (Cholecalciferol) |
| Molybdenum | 35% | Vitamin B12 (Cyanocobalamin) |
| Chloride | 17% | |

*) Percent Daily Values are based on a 2,000 calorie diet.

TABLE 11

The Nutrition Facts and Ingredients used for the preparation of the inventive refrigerated ready-to-drink (RTD) pasteurized and/or ultra-pasteurized with fiber nutritional composition (Vanilla Flavor),

| Nutrition Facts | % Daily Value* | Ingredients |
| --- | --- | --- |
| Serving Size: 8 fl oz. | | Water |
| Amount per Serving | | Corn Syrup solids |
| Calories 250 | | Sugar (sucrose) |
| Calories from Fat 47 | | Calcium Caseinate |
| Total Fat 5.2 g | 8% | Canola Oil |
| Saturated Fat 0.5 g | 3% | Oat Fiber |
| Cholesterol 5 mg | 2% | Milk Protein Concentrate |
| Sodium 140 mg | 6% | Natural & Artificial Flavor |
| Potassium 400 mg | 11% | Isolated Soy Proteins |
| Total Carbohydrate 43.3 g | 14% | Corn Oil |
| Dietary Fiber 2.5 g | 0% | Potassium Phosphates |
| Sugars 8.5 g | | Magnesium Chloride |
| Protein 10 g | 20% | Soy Lecithin |
| Vitamin A, | 25% | Calcium Citrate |
| (25% as Beta Carotene) | | Sodium Chloride |
| Vitamin C | 50% | Sodium Phosphate |
| Calcium | 50% | Sodium Ascorbate |
| Iron | 25% | Zinc Carrageenan |
| Vitamin D | 25% | Ferrous Sulfate |
| Vitamin E | 50% | Zinc Sulfate |
| Vitamin K | 25% | Vitamin E (aplha-tocopheryl acetate) |
| Thiamine | 25% | Niacinamide |
| Riboflavin | 25% | Calcium Pantothenate |
| Niacin | 25% | Manganese Sulfate |
| Vitamin B6 | 25% | Copper Sulfate |
| Folate | 25% | Vitamin A Palmitate |
| Vitamin B12 | 25% | Pyridoxine hydrochloride |
| Biotin | 25% | Vitamin B2 (Riboflavin) |
| Pantothenic Acid | 25% | Vitamin B1 (Thiamin monoitrate) |
| Phosphorus | 25% | Beta Carotene |
| Iodine | 25% | Chromium Chloride |
| Magnesium | 25% | Folic Acid |
| Zinc | 25% | Biotin |
| Selenium | 25% | Potassium Iodide |
| Copper | 25% | Sodium Molybdate |
| Manganese | 25% | Sodium Selenate |
| Chromium | 25% | Vitamin K1 (Phytonadione) |
| Molybdenum | 25% | Vitamin D3 (Cholecalciferol) |
| Chloride | 12% | Vitamin B12 (Cyanocobalamin) |

*) Percent Daily Values are based on a 2,000 calorie diet.

TABLE 12

The Nutrition Facts and Ingredients used for the preparation of the inventive refrigerated ready-to-drink (RTD) pasteurized and/or ultra-pasteurized standard nutritional composition (Vanilla Flavor), using lactose-free milk as the base.

| Nutrition Facts | % Daily Value* | Ingredients |
| --- | --- | --- |
| Serving Size: 8 fl oz. | | Lactose-Free Skim Milk |
| Amount per Serving | | Corn Syrup solids |
| Calories 250 | | Canola Oil |
| Calories from Fat 47 | | Sugar (sucrose) |
| Total Fat 5.2 g | 8% | Natural & Artificial Flavor |
| Saturated Fat 0.5 g | 3% | Calcium Caseinate |
| Cholesterol 5 mg | 2% | Isolated Soy Proteins |
| Sodium 140 mg | 6% | Corn Oil |
| Potassium 400 mg | 11% | Potassium Phosphates |
| Total Carbohydrate 43.3 g | 14% | Calcium Citrate |
| Dietary Fiber 2.5 g | 0% | Magnesium Chloride |
| Sugars 8.5 g | | Soy Lecithin |
| Protein 10 g | 20% | Sodium Chloride |
| Vitamin A, | 25% | Sodium Phosphate |
| (25% as Beta Carotene) | | Sodium Ascorbate |
| Vitamin C | 50% | Carrageenan |
| Calcium | 50% | Ferrous Sulfate |

TABLE 12-continued

The Nutrition Facts and Ingredients used for the preparation of the inventive refrigerated ready-to-drink (RTD) pasteurized and/or ultra-pasteurized standard nutritional composition (Vanilla Flavor), using lactose-free milk as the base.

| Nutrition Facts | % Daily Value* | Ingredients |
| --- | --- | --- |
| Iron | 25% | Zinc Sulfate |
| Vitamin D | 25% | Vitamin E (aplha-tocopheryl acetate) |
| Vitamin E | 50% | Niacinamide |
| Vitamin K | 25% | Calcium Pantothenate |
| Thiamine | 25% | Maganese Sulfate |
| Riboflavin | 25% | Copper Sulfate |
| Niacin | 25% | Vitamin A Palmitate |
| Vitamin B6 | 25% | Pyridoxine hydrochloride |
| Folate | 25% | Vitamin B2 (Riboflavin) |
| Vitamin B12 | 25% | Vitamin B1 (Thiamin monoitrate) |
| Biotin | 25% | Beta Carotene |
| Pantothenic Acid | 25% | Chromium Chloride |
| Phosphorus | 25% | Folic Acid |
| Iodine | 25% | Biotin |
| Magnesium | 25% | Potassium Iodide |
| Zinc | 25% | Sodium Molybdate |
| Selenium | 25% | Sodium Selenate |
| Copper | 25% | Vitamin K1 (Phytonadione) |
| Manganese | 25% | Vitamin D3 (Cholecalciferol) |
| Chromium | 25% | Vitamin B12 (Cyanocobalamin) |
| Molybdenum | 25% | |
| Chloride | 12% | |

*) Percent Daily Values are based on a 2,000 calorie diet.

What is claimed is:

1. A refrigeration-shelf-stable ready-to-drink complete nutritional composition being thermally treated under conditions of pasteurization or ultra-pasteurization comprising, per eight fluid ounces:
   a. from about 10% to about 25% of the daily value of carbohydrate;
   b. from about 5% to about 40% of the daily value of protein;
   c. from about 20% to about 50% of the daily value of each of the following: vitamin A, iron, vitamin D, vitamin K, thiamine, riboflavin, niacin, vitamin B6, folate, vitamin B12, biotin, pantothenic acid, phosphorus, iodine, magnesium, zinc, selenium, copper, manganese, chromium, and molybdenum;
   d. about 5% to about 25% of the daily requirement of potassium;
   e. sodium in the amount of about 0.1% to about 20% of the daily value of sodium;
   f. about 20% to about 80% of each of the following: vitamin C, calcium, vitamin E; and
   g. about 5% to about 40% of the daily value of chloride;
   wherein the total calorie content is from about 5% to about 20% of the daily value and the daily value is based on a 2,000 calorie diet.

2. The composition of claim 1 further including from about 0.1% to about 20% of the daily value of sodium.

3. The composition of claim 1 further including about 0.1% to about 12% of the daily value of fat.

4. The composition of claim 1 further including about 0.1% to about 20% of the daily value of dietary fiber.

5. The composition of claim 4 formulated for constipation patients.

6. The composition of claim 4 formulated for abdominal distension patients.

7. The composition of claim 4 formulated for Inflammatory Bowel Disease patients.

8. The composition of claim 1 wherein said being thermally treated further comprises, microwave heating or ohmic heating.

9. The composition of claim 1 having a refrigeration shelf-life of up to about 16 weeks at temperatures of from about 1° C. to about 7° C.

10. The composition of claim 1 having a refrigeration shelf-life of up to about 16 weeks at temperatures of from about 3° C. to about 4° C.

11. The composition of claim 1, wherein said composition meets the requirements of a Nutritional Supplement for human use.

12. The composition of claim 11, wherein said composition is a light or low fat composition.

13. The composition of claim 11, wherein said composition is a fat-free composition.

14. The composition of claim 11, wherein said composition is a high protein composition.

15. The composition of claim 11, wherein said composition is a plus or extra strength composition.

16. The composition of claim 11, wherein said composition is a fiber-containing composition.

17. The composition of claim 1, wherein said composition meets the requirements of a Food for Special Dietary Use for human use.

18. The composition of claim 17, wherein said composition is a hypoallergenic food.

19. The composition of claim 17, wherein said composition is an infant food.

20. The composition of claim 17, wherein said composition is a pediatric food.

21. The composition of claim 17, wherein said composition is a geriatric food.

22. The composition of claim 17, wherein said composition is a food for reducing and maintaining weight.

23. The composition of claim 17, wherein said composition is a food for use in the diet of diabetics.

24. The composition of claim 17, wherein said composition is a food used to regulate sodium intake.

25. The composition of claim 1, wherein said composition meets the requirements of a Medical Food for human use.

26. The composition of claim 1, wherein said ultra-pasteurization is conducted at 130° C. to about 150° C. for about 2 to about 5 seconds.

27. The composition of claim 1, wherein said ultra-pasteurization uses direct sterilization selected from the group consisting of steam injection or steam infusion.

28. The composition of claim 1, wherein said ultra-pasteurization uses indirect sterilization which comprises a heat exchanger.

29. The composition of claim 1, wherein said pasteurization is conducted at about 75° to about 95° C. for about 15 to about 55 seconds.

30. The composition of claim 1, wherein the composition is in a package assembly comprising a gable-top carton or a plastic container.

31. The composition of claim 1, further including additional amounts of natural antioxidants selected from the group consisting of vitamin C, vitamin E, beta-carotene, selenium, zinc, and combinations thereof.

32. The composition of claim 1, further including phenolic antioxidants selected from the group consisting of butylhydroxy anisole, butylhydroxy toluene, tertiary butyl hydroquinone, propyl gallate, and combinations thereof.

33. The composition of claim 1, further including an herb, an herb extract, a botanical, a botanical extract, an amino acid, and combinations thereof.

34. The composition of claim 1, further including a phytochemical.

35. The composition of claim 1, further including at least one non-nutritive or non-essential component.

36. The composition of claim 1, further including a nutraceutical.

37. The composition of claim 1, further including an antimicrobial agent.

38. The composition of claim 1, further including a pharmaceutical.

39. The composition of claim 1, wherein the % Daily Value (% D.V.) of macro nutrients in 8 fluid oz of said composition is about 0.1% to about 12% for fat, about 8% to about 20% for carbohydrate, and about 7 to about 35% for protein.

40. The composition of claim 1, wherein the source of protein is selected from the group consisting of lactose-free skim milk, casein or caseinate, whey protein, whey protein concentrate, whey protein isolate, milk protein concentrate, milk protein isolate, soy protein, and combinations thereof.

41. The composition of claim 1, wherein the source of fat is selected from the group consisting of vegetable oils, medium chain triglycerides and combinations thereof.

42. The composition of claim 41, wherein the source of fat is selected from the group consisting of sunflower oil, canola oil, olive oil, safflower oil, cottonseed oil, corn oil, soybean oil, $C_6$–$C_{12}$ triglycerides and combinations thereof.

43. The composition of claim 1, wherein the source of carbohydrate is selected from the group consisting of sucrose, corn syrup solids, glucose, fructose, maltodextrin or combination thereof.

44. The composition of claim 1, wherein the protein source is selected from the group consisting of enzymatically-hydrolyzed proteins or peptides, amino acids, and combinations thereof.

45. A refrigeration-shelf-stable ready-to-drink composition according to claim 1 comprising per 8 fluid ounces:

| | |
|---|---|
| Vitamin A | about 23 to about 35% |
| Sodium | about 0.1% to about 20% |
| Vitamin C | about 23 to about 70% |
| Vitamin D | about 23 to about 35% |
| Vitamin F | about 30 to about 70% |
| Vitamin K | about 23 to about 35% |
| Thiamine | about 23 to about 35% |
| Riboflavin | about 23 to about 35% |
| Niacin | about 23 to about 35% |
| Vitamin B6 | about 23 to about 35% |
| Folate | about 23 to about 35% |
| Vitamin B12 | about 23 to about 35% |
| Biotin | about 23 to about 35% |
| Pantothenic Acid | about 23 to about 35% |
| Calcium | about 40 to about 70% |
| Iron | about 23 to about 35% |
| Phosphorus | about 23 to about 35% |
| Iodine | about 23 to about 35% |
| Magnesium | about 23 to about 35% |
| Zinc | about 23 to about 35% |
| Selenium | about 23 to about 35% |
| Copper | about 23 to about 35% |
| Manganese | about 23 to about 35% |
| Chromium | about 23 to about 35% |
| Molybdenum | about 23 to about 35% |
| Chloride | about 10 to about 25% | wherein said percentages are based on the daily value and the daily value is based on a 2,000 calorie diet.

46. The composition of claim 45, further including protein in the amount of 5% to about 40% of the daily value.

47. The composition of claim 45, further including carbohydrate in the amount of 10% to about 25% of the daily value.

48. The composition of claim 47, wherein the source of dietary fiber is selected from the group consisting of oat fiber, soy fiber, and combinations thereof.

49. The composition of claim 45, further including dietary fiber in the amount of about 0.1% to about 20% of the daily value.

50. The composition of claim 45 further including beta carotene in the amount of about 25% to about 35% of vitamin A.

51. The composition of claim 1, further including a sweetener selected from the group consisting of saccharine, aspartame, asulfame potassium, sucrolose and combinations thereof.

52. The composition of claim 1 formulated by adjusting the level of sodium for cardiovascular patients.

53. The composition of claim 1 formulated by adjusting the level of sodium for cancer patients with malignant neoplasms.

54. The composition of claim 53 including a chemopreventive agent selected from the group consisting of blocking agents, suppressing agents, and combinations thereof.

55. The composition of claim 1 formulated for cachexia patients.

56. The composition of claim 1 formulated for stroke and neurological impairment patients.

57. The composition of claim 1 further including additional protein for surgery patients.

58. The composition of claim 1 formulated for limited respiratory function and Chronic Obstructive Pulmonary Disease (COPD) patients.

59. The composition of claim 1 formulated for HIV+ or AIDS patients.

60. The composition of claim 1 having the amino acid content formulated for chronic hepatic patients.

61. The composition of claim 1 having the amino acid and protein content formulated for chronic renal failure patients.

62. The composition of claim 1 further including collagen for wound healing patients.

63. The composition of claim 1 further including collagen for burn healing patients.

64. The composition of claim 1 formulated with a calcium content for bone-fracture healing patients.

65. The composition of claim 1 formulated for diarrhea patients.

66. The composition of claim 1 further including adjustments of protein, fat and carbohydrates for chronic pancreatitis patients.

67. The composition of claim 1 formulated for cystic fibrosis patients.

68. The composition of claim 1 formulated for non-specific malabsorption or maldigestion patients.

69. The composition of claim 1 formulated for dysphagia patients.

70. The composition of claim 1 formulated for animal.

71. The composition of claim 1 further including sodium in the amount of about 0.1% to about 20% of the daily value of sodium.

* * * * *

UNITED STATES PATENT AND TRADEMARK OFFICE
CERTIFICATE OF CORRECTION

PATENT NO. : 5,985,339
DATED : November 16, 1999
INVENTOR(S) : Kamarei, A.R.

It is certified that error appears in the above-identified patent and that said Letters Patent is hereby corrected as shown below:

At column 3, line 19, the printed patent incorrectly reads "104 per gram."; the patent should read --$10^4$ per gram.--.

At column 10, line 64, the printed patent incorrectly reads "the above specifieci"; the patent should read --the above specified".

At column 14, lines 24-25, the printed patent incorrectly reads "fmctions"; the patent should read --functions--.

In claim 45 at column 40, line 6, the printed patent incorrectly reads "Vitamin F"; the patent should read --Vitamin E--.

Signed and Sealed this

Seventh Day of November, 2000

Attest:

Q. TODD DICKINSON

*Attesting Officer*   *Director of Patents and Trademarks*